(12) United States Patent
Unno et al.

(10) Patent No.: US 7,374,510 B2
(45) Date of Patent: May 20, 2008

(54) VEHICLE HAVING CONTINUOUSLY VARIABLE TRANSMISSION

(75) Inventors: Toshio Unno, Shizuoka (JP); Masaya Sakaue, Shizuoka (JP); Ryousuke Asaoka, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 245 days.

(21) Appl. No.: 11/173,138

(22) Filed: Jul. 1, 2005

(65) Prior Publication Data

US 2006/0003866 A1 Jan. 5, 2006

(30) Foreign Application Priority Data

Jul. 2, 2004 (JP) .............................. 2004-196903
Feb. 3, 2005 (JP) .............................. 2005-027136

(51) Int. Cl.
*F16H 61/662* (2006.01)

(52) U.S. Cl. ..................... 477/44; 477/37; 192/105 CD

(58) Field of Classification Search ..................... None
See application file for complete search history.

(56) References Cited

U.S. PATENT DOCUMENTS

| 6,379,278 | B1 * | 4/2002 | Eguchi et al. ................ 477/34 |
| 6,379,282 | B1 * | 4/2002 | Aoki .......................... 477/109 |
| 7,065,441 | B2 * | 6/2006 | Yamamoto et al. ........... 701/51 |
| 2006/0030449 | A1 * | 2/2006 | Tsukada et al. ................ 477/3 |

FOREIGN PATENT DOCUMENTS

JP 2584618 B 11/1996

* cited by examiner

*Primary Examiner*—David D. Le
(74) *Attorney, Agent, or Firm*—Keating & Bennett, LLP

(57) ABSTRACT

A vehicle that effectively sets a gear ratio when a driver turns off a main switch during running of the vehicle includes an engine, a main switch arranged to control the engine and being operable by a driver, a continuously variable transmission arranged to transmit a drive force generated at the engine to a rear wheel, and a speed change control apparatus arranged to control a gear ratio of the continuously variable transmission and continuously control the gear ratio of the continuously variable transmission after the engine is instructed to stop due to the driver turning off the main switch.

19 Claims, 18 Drawing Sheets

VEHICLE HAVING CONTINUOUSLY VARIABLE TRANSMISSION

BACKGROUND OF THE INVENTION

1. Field of the Invention

The present invention relates to a vehicle, and more particularly, the present invention relates to a vehicle having a continuously variable transmission.

2. Description of the Related Art

A known vehicle having a continuously variable transmission is a scooter type motorcycle. According to the scooter type motorcycle, a continuously variable transmission of a V belt type, a toroidal type or the like is used.

According to such a scooter type motorcycle having a continuously variable transmission, during normal operation, an optimum target gear ratio (target engine rotational speed) is calculated from a throttle opening degree (accelerator opening degree) and a vehicle speed or the like, and an actual gear ratio is controlled to be the calculated target gear ratio. In this case, in a state in which the motorcycle is stopped (state in which the vehicle speed is 0), the gear ratio of the continuously variable transmission normally becomes low (maximum gear ratio). As a result, when starting the motorcycle the next time after stopping the motorcycle, normally, the gear ratio of the continuously variable transmission is low. When an engine is started in the state in which the gear ratio is low, an engine output is converted to provide a large torque to be transmitted to a rear wheel and therefore, a load of the engine during starting is minimized.

However, according to the above-described motorcycle having the continuously variable transmission, when a driver turns off a main switch while the motorcycle is running, the engine is stopped and a speed change control is interrupted while the gear ratio is in a state other than the low state. When the engine is stopped while the gear ratio is set in a state other than the low state, when the engine is attempted to be started again to start the motorcycle the next time, the torque transmitted to the rear wheel is small and therefore, the load of the engine is increased to prevent smooth starting from happening.

Japanese Patent Publication No. 2584618 attempted to solve such a problem by providing a motorcycle constructed such that when a gear ratio of a continuously variable transmission is not low after stopping an engine, the engine is started only after first forcibly returning the gear ratio of the continuously variable transmission to the low state during the starting operation carried out the next time the motorcycle is started. According to Japanese Patent Publication No. 2584618, by starting the engine after first returning the gear ratio to the low state during the starting operation, even when a speed change control is interrupted in a state in which the gear ratio is other than low by a driver turning a main switch OFF during operation, the load of the engine can be prevented from being increased during starting the next time.

However, although in Japanese Patent Publication No. 2584618, the load of the engine can be prevented from being increased during the starting operation by waiting to start the engine until after the gear ratio of the continuously variable transmission has been returned to the low state, there is a drawback with this method because the actual starting of the motorcycle is delayed by a period of time equal to the time required to return the gear ratio of the continuously variable transmission to low. Therefore, it is difficult to carry out smooth starting in a timely manner.

Further, in Japanese Patent Publication No. 2584618, as described above, the control for returning the gear ratio of the continuously variable transmission to the low state is not performed until during the starting operation performed the next time after stopping the motorcycle. Therefore, when the speed change control is interrupted while the gear ratio is in a state other than the low state by turning the main switch OFF while the motorcycle is running, the speed change to the low state is not carried out until the starting operation performed the next time after stopping the motorcycle. Therefore, when the main switch is turned OFF during running of the motorcycle, the motorcycle is run by inertia while the gear ratio is fixed to a gear ratio at an upper end of the range of gear ratios. In a state in which the gear ratio is fixed to the gear ratio at the upper range thereof, there is a problem that the engine brake is difficult to operate.

SUMMARY OF THE INVENTION

In order to overcome the problems described above, preferred embodiments of the present invention provide a vehicle that is capable of effectively setting a gear ratio when a driver turns off a main switch during running of the vehicle.

According to a preferred embodiment of the present invention, a vehicle includes a drive force generating device, a first switch arranged to control the drive force generating device and being operable by a driver of the vehicle, a continuously variable transmission arranged to transmit a drive force generated by the drive force generating device to a drive wheel, and a speed change controller arranged to control a gear ratio of the continuously variable transmission and continuously control the gear ratio of the continuously variable transmission after the drive force generating device is instructed to stop by the driver turning the first switch OFF.

As a result of the speed change controller continuously controlling the gear ratio of the continuously variable transmission after the drive force generating device is instructed to stop by the turning OFF of the first switch during running of the vehicle, even after the drive force generating device has been instructed to stop, the gear ratio of the continuously variable transmission can continuously be controlled by the speed change controller and therefore, the gear ratio of the continuously variable transmission can be made close to low or low while the vehicle is still running (before stopping). Consequently, during a starting operation the next time the vehicle is started after the vehicle has been stopped by the user turning OFF the first switch, the drive force generating device can be started in a low state or a state that is close to the low state, and therefore, the drive force generated by the drive force generating device can be converted into a large torque to transmit to the drive wheel. As a result, smooth starting can be carried out. Further, even after the drive force generating device is instructed to stop by turning the first switch OFF during running of the vehicle, the continuously variable transmission can be made to be close to low or low while the vehicle is still running (before stopping) and therefore, it is not necessary to return the gear ratio of the continuously variable transmission to the low state during the starting operation the time the vehicle is started after stopping. Thus, a time period until actually starting the vehicle after initiating the starting operation is minimized. Further, by continuously controlling the gear ratio of the continuously variable transmission after the drive force generating device is instructed to stop, the vehicle can be run by inertia while executing the speed change control to the low state by the speed change controller. Thereby, even after the drive force generating device is instructed to stop, the vehicle can be run in a state that the engine brake is very easy to operate and thus, the operability of the vehicle is greatly improved.

Preferably, the vehicle according to a first preferred embodiment of the present invention further includes a power supply arranged to supply power to the speed change controller. The power supplying maintains the supply of power to the speed change controller to continue a speed change control when a vehicle speed is greater than a predetermined value after the drive force generating device is instructed to stop by the driver of the vehicle turning the first switch OFF. When arranged in this way, even after the drive force generating device is instructed to stop by turning OFF of the first switch while the vehicle is running, the speed change controller can continue to control the gear ratio of the continuously variable transmission until the vehicle speed becomes equal to or less than the predetermined value. As a result, the gear ratio of the continuously variable transmission can be made to be low very easily.

In such a vehicle, preferably, the speed change controller is arranged to control the continuously variable transmission when a vehicle speed is greater than a predetermined value after the drive force generating device is instructed to stop by turning OFF of the first switch. When arranged in this way, even after the drive force generating device is instructed to stop by turning OFF of the first switch while the vehicle is still running, the gear ratio of the continuously variable transmission can easily be made to be close to low.

When the vehicle speed is greater than the predetermined value, in the vehicle for controlling the continuously variable transmission, preferably, the speed change controller controls the continuously variable transmission based on a map for a speed change control when the vehicle speed is greater than the predetermined value after the drive force generating device is instructed to stop by turning OFF of the first switch. When arranged in this way, ever after the drive force generating device is instructed to stop by turning the first switch OFF while the vehicle is running, the gear ratio of the continuously variable transmission easily can be made to be close to low by using the map for the speed change control.

When the vehicle speed is greater than the predetermined value, in the vehicle for controlling the continuously variable transmission, preferably, the speed change controller sets a target gear ratio of the continuously variable transmission to a value in a lower range when the vehicle speed is greater than the predetermined value after the drive force generating device is instructed to stop by turning OFF of the first switch. When arranged in this way, after the drive force generating device is instructed to stop by turning OFF of the first switch while the vehicle is running, in comparison with the case of using the map for the speed change control, the gear ratio of the continuously variable transmission can be quickly made to be low.

When the vehicle speed is greater than the predetermined value, in the vehicle for controlling the continuously variable transmission, preferably, when the gear ratio becomes a predetermined value in a lower range after the drive force generating device is instructed to stop by turning the first switch OFF, the speed change controller maintains the predetermined gear ratio in the lower range until the vehicle speed becomes equal to or less than the predetermined value. When arranged in this way, even when a road is going downhill after the gear ratio reaches the predetermined value in the lower range after turning OFF of the first switch, the gear ratio is not varied from the lower range to an upper range due to an increase in a vehicle speed. Therefore, the vehicle can travel on the downhill while easily operating the engine brake. Thereby, the operability of the vehicle for the driver is greatly improved.

Preferably, the vehicle according to a preferred embodiment of the present invention also includes a power supply arranged to supply power to the speed change controller, and a second switch connected between the power supply and the speed change controller and turned ON in response to turning the first switch ON, wherein when the vehicle speed is greater than the predetermined value after the drive force generating device is instructed to stop by turning OFF of the first switch, the speed change controller maintains an ON state of the second switch and brings the second switch into an OFF state when the vehicle speed becomes equal to or less than the predetermined value. When arranged in this way, in the case in which the first switch is turned OFF by the driver while the vehicle is running, the power is continuously supplied from the power supply to the speed change controller by maintaining the second switch in the ON state, and supply of power from the power supply to the speed change controller is cut by turning the second switch OFF when the vehicle speed becomes equal to or less than the predetermined value. Thereby, the gear ratio can be close to low even after turning OFF of the first switch and when the vehicle speed becomes equal to or less than the predetermined value, the control of the gear ratio by the speed change controller can be easily stopped.

When the vehicle speed is greater than the predetermined value, in the vehicle in which the speed change controller controls the continuously variable transmission, preferably, the predetermined value of the vehicle speed is 0. When arranged in this way, the gear ratio of the continuously variable transmission can be made to be close to low until stopping the vehicle and therefore, the gear ratio of the continuously variable transmission can further be made to be close to low.

In the vehicle according to the above-described preferred embodiment of the present invention, the speed change controller preferably continuously controls the gear ratio by setting a target gear ratio of the continuously variable transmission to a predetermined value in a lower range when the gear ratio becomes the predetermined value in the lower range. When arranged in this way, even when the road is oriented downhill after the gear ratio reaches the predetermined value in the lower range after turning the first switch OFF, the gear ratio is not varied from the lower range to the upper range due to an increase in the vehicle speed. Thereby, the vehicle can travel downhill while the engine brake can be easily operated. As a result, operability of the vehicle for the driver is greatly improved.

Preferably, in the vehicle according to a preferred embodiment of the present invention, the continuously variable transmission includes a first drive force transmitter supplied with a drive force from the drive force generating device and a second drive force transmitter arranged to transmit the drive force from the first drive force transmitter to the drive wheel, wherein the speed change controller continuously controls the gear ratio of the continuously variable transmission by detecting rotation of at least one of the first drive force transmitter and the second drive force transmitter. When arranged in this way, even after the drive force generating device is instructed to stop, the gear ratio of the continuously variable transmission can be controlled until the rotational speed of at least one of the first drive force transmitter and the second drive force transmitter becomes, for example, equal to or less than the predetermined value and therefore, the gear ratio of the continuously variable transmission can easily be made to be close to low. Further, when the rotational speed of at least one of the first drive force transmitter and the second drive force transmitter becomes, for example, equal to or less than the predetermined value, the gear ratio of the continuously variable transmission is not controlled and therefore, the gear ratio of the continuously variable transmission can be prevented from being changed after stopping to rotate the first drive force transmitter and the second drive force transmitter. When the belt type continuously variable transmission is used, the gear ratio of the continuously variable transmission is not changed after stopping to rotate the first drive force transmitter and the second drive force transmitter and therefore, a tension of the belt member can maintained effectively. Thus, damage to the belt member when the engine is restarted in a state of loosening the belt member is prevented.

In the vehicle in which the continuously variable transmission includes the first drive force transmitter and the second drive force transmitter, preferably, the speed change controller stops controlling the continuously variable transmission when a rotational speed of at least one of the first drive force transmitter and the second drive force transmitter becomes equal to or less than a predetermined value. When arranged in this way, in the case in which the rotational speed of either one of the first drive force transmitter and the second drive force transmitter becomes equal to or less than the predetermined rotational speed, the gear ratio of the continuously variable transmission is not controlled and therefore, after stopping rotation of the first drive force transmitter and the second drive force transmitter, the gear ratio of the continuously variable transmission can easily be prevented from being controlled.

Preferably, the vehicle in which the continuously variable transmission includes the first drive force transmitter and the second drive force transmitter further includes a clutch arranged at either a position between the second drive force transmitter and the drive wheel or a position between the drive force generating device and the first drive force transmitter. When the clutch is, for example, a centrifugal clutch, in the case of arranging the centrifugal clutch between the second drive force transmitter and the drive wheel, the centrifugal clutch does not transmit the drive force when the rotational speed becomes equal to or less than the predetermined rotational speed and therefore, whereas the first drive force transmitter and the second drive force transmitter are stopped from rotating, the vehicle continues to run. In this case, when the gear ratio continues to be controlled until the vehicle speed becomes equal to or less than the predetermined value after stopping rotation of the first drive force transmitter and the second drive force transmitter, even after stopping the first drive force transmitter and the second drive force transmitter, the gear ratio of the continuously variable transmission is controlled and therefore, the belt member is loosened by moving only the sheave of the first drive force transmitter to the lower range in the state of stopping the sheave of the second drive force transmitter as described above. Therefore, particularly, when the centrifugal clutch is provided, it is effective to prevent the belt member from being loosened by preventing the gear ratio of the continuously variable transmission from being controlled when the rotational speed of at least one of the first drive force transmitter and the second drive force transmitter becomes equal to or smaller than the predetermined value by controlling the gear ratio of the continuously variable transmission by detecting rotation of at least one of the first drive force transmitter and the second drive force transmitter. Further, when the clutch is, for example, the centrifugal clutch, in the case of arranging the centrifugal clutch between the drive force generating device and the first drive force transmitter, when the rotational speed of the centrifugal clutch becomes equal to or less than the predetermined rotational speed, the drive force of the drive force generating device is not transmitted to the first drive force transmitter and therefore, when the rotational speed of the centrifugal clutch becomes equal to or less than the predetermined rotational speed, the rotational speed of the first drive force transmitter cannot be detected by detecting rotation of the drive force generating device. Therefore, particularly, when the centrifugal clutch is provided, it is effective to prevent the belt member from being loosened by preventing the gear ratio of the continuously variable transmission from being controlled when the rotational speed of at least one of the first drive force transmitter and the second drive force transmitter becomes equal to or smaller than the predetermined value by controlling the gear ratio of the continuously variable transmission by directly detecting rotation of at least one of the first drive force transmitter and the second drive force transmitter.

Preferably, the vehicle having the clutch arranged at either a position between the second drive force transmitter and the drive wheel or a position between the drive force generating device and the first drive force transmitter further includes the clutch arranged between the second drive force transmitter and the drive wheel, wherein the speed change controller continuously controls the continuously variable transmission by detecting rotation of the drive force generating device and stops controlling the continuously variable transmission when a rotational speed of the drive force generating device becomes equal to or less than a predetermined value. When arranged in this way, in the case in which the rotational speed of the drive force generating device becomes equal to or less than the predetermined value, the gear ratio of the continuously variable transmission is not controlled and therefore, the gear ratio of the continuously variable transmission can easily be prevented from being controlled after stopping rotation of the first drive force transmitter and the second drive force transmitter. As a result, the belt member can easily be prevented from being loosened by moving only the sheave of the first drive force transmitter to the lower range in the state of stopping the sheave of the second drive force transmitter due to the fact that the gear ratio of the continuously variable transmission is controlled after stopping rotation of the first drive force transmitter and the second drive force transmitter.

Preferably, the vehicle having the clutch arranged at either a position between the second drive force transmitter and the drive wheel or a position between the drive force generating device and the first drive force transmitter further includes the clutch arranged between the drive force generating device and the first drive force transmitter, wherein the speed change controller continuously controls the continuously variable transmission by detecting rotation of the first drive force transmitter. When arranged in this way, the rotational speed of the continuously variable transmission can easily be detected.

In the vehicle having the clutch arranged between the drive force generating device and the first drive force transmitter, preferably, the speed change controller stops the control of the continuously variable transmission when a rotational speed of the first drive force transmitter becomes equal to or less than a predetermined value. When arranged in this way, in the case in which the rotational speed of the first drive force transmitter becomes equal to or less than the predetermined value, the gear ratio of the continuously variable transmission is not controlled and therefore, the gear ratio of the continuously variable transmission can easily be prevented from being controlled after stopping rotation of the first drive force transmitter and the second drive force transmitter. As a result, when the belt type continuously variable transmission is used, the belt member can easily be prevented from being loosened by moving only the sheave of the first drive force transmitter to the lower range in the state of stopping the sheave of the second drive force transmitter due to the fact that the gear ratio of the continuously variable transmission is controlled after stopping rotation of the first drive force transmitter and the second drive force transmitter.

In the vehicle for stopping control the continuously variable transmission when the rotational speed of at least one of the first drive force transmitter and the second drive force transmitter, the rotational speed of the drive force generating device, or the rotational speed of the first drive force transmitter becomes equal to or smaller than the predetermined value, the predetermined value is 0. When arranged in this way, the gear ratio of the continuously variable transmission can be close to low until the rotational speed of the first drive force transmitter, the second drive force transmitter or the drive force generating device becomes 0 and therefore, the gear ratio of the continuously variable transmission can further be made to be close to low.

In the vehicle in which the continuously variable transmission includes the first drive force transmitter and the second drive force transmitter, preferably, the continuously variable transmission is preferably an electrically controlled belt type continuously variable transmission. When the belt type continuously variable transmission which is electrically controlled in this way is used, the gear ratio of the continuously variable transmission can easily be controlled. Further, when, for example, a belt type continuously variable transmission in which only the first drive force transmitter is electrically controlled is used, it is easy to bring about a drawback that the belt member is loosened by moving only the sheave of the first drive force transmitter to the lower range in the state of stopping the sheave of the second drive force transmitter due to the fact that the gear ratio of the continuously variable transmission is controlled after stopping rotation of the first drive force transmitter and the second drive force transmitter. In this case, it is effective to prevent the belt member from being loosened by preventing the gear ratio of the continuously variable transmission from being controlled when the rotational speed of at least one of the first drive force transmitter and the second drive force transmitter becomes equal to or less than the predetermined value by controlling the gear ratio of the continuously variable transmission by detecting rotation of at least one of the first drive force transmitter and the second drive force transmitter.

In the vehicle having the belt type continuously variable transmission, preferably, a belt member of the belt type continuously variable transmission is made of an elastomer. The belt member made of the elastomer is liable to be damaged when the belt member is loosened. Therefore, the gear ratio of the continuously variable transmission is prevented from being controlled when the rotational speed of at least one of the first drive force transmitter and the second drive force transmitter becomes equal to or less than the predetermined value by controlling the gear ratio of the continuously variable transmission by detecting rotation of at least one of the first drive force transmitter and the second drive force transmitter. As a result, the tension of the belt member can be effectively maintained and therefore, damage to the belt member due to loosening of the belt member can be prevented.

Preferably, the vehicle in which the continuously variable transmission includes the first drive force transmitter and the second drive force transmitter further includes the first drive force transmitter arranged to receive the drive force from the drive force generating device, and the second drive force transmitter arranged to transmit the drive force received from the first drive force transmitter to the drive wheel, wherein the speed change controller controls the gear ratio of the continuously variable transmission by electrically controlling only either one of the first drive force transmitter and the second drive force transmitter. For example, when the belt type continuously variable transmission in which only the first drive force transmitter is electrically controlled is used, it is easy to bring about a drawback that the belt member is loosened by moving only the sheave on the side of the first drive force transmitter to the lower range in the state of stopping the sheave of the second drive force transmitter due to the fact that the gear ratio of the continuously variable transmission is controlled after stopping rotation of the first drive force transmitter and the second drive force transmitter. However, it is particularly effective to prevent loosening of the belt member by preventing the gear ratio of the continuously variable transmission from being controlled when the rotational speed of at least one of the first drive force transmitter and the second drive force transmitter becomes equal to or less than the predetermined value by controlling the gear ratio of the continuously variable transmission by detecting rotation of at least one of the first drive force transmitter and the second drive force transmitter.

Other features, elements, steps, processes, arrangements and advantages of the present invention will become more apparent from the following detailed description of preferred embodiments thereof with reference to the attached drawings.

DETAILED DESCRIPTION OF PREFERRED EMBODIMENTS

Preferred embodiments of the present invention will be explained with reference to the drawings as follows.

First Preferred Embodiment

Figure 1:
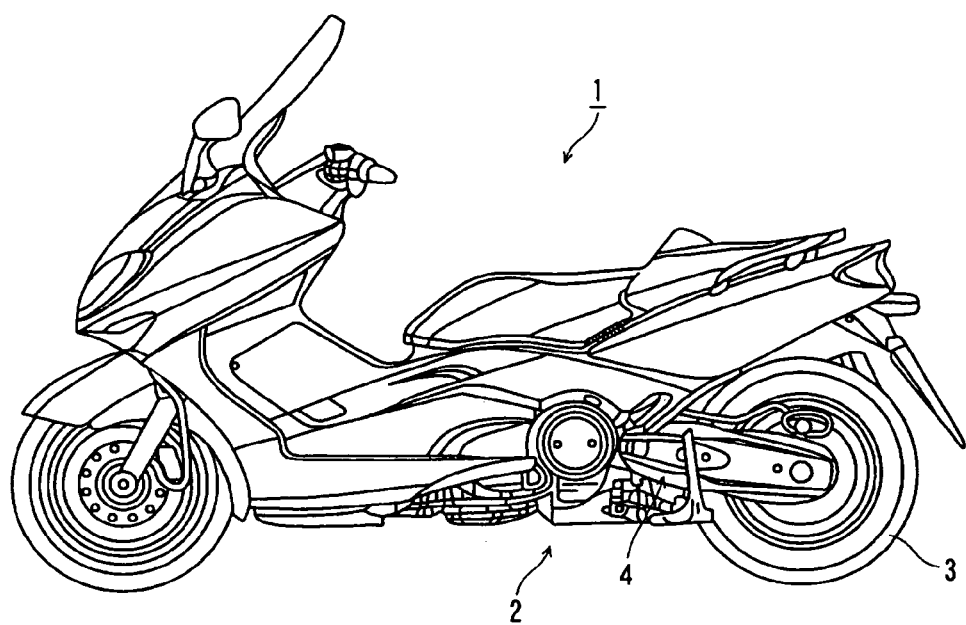
FIG. 1 is a side view showing an overall structure of a motorcycle according to a first preferred embodiment of the invention.
Figure 2:
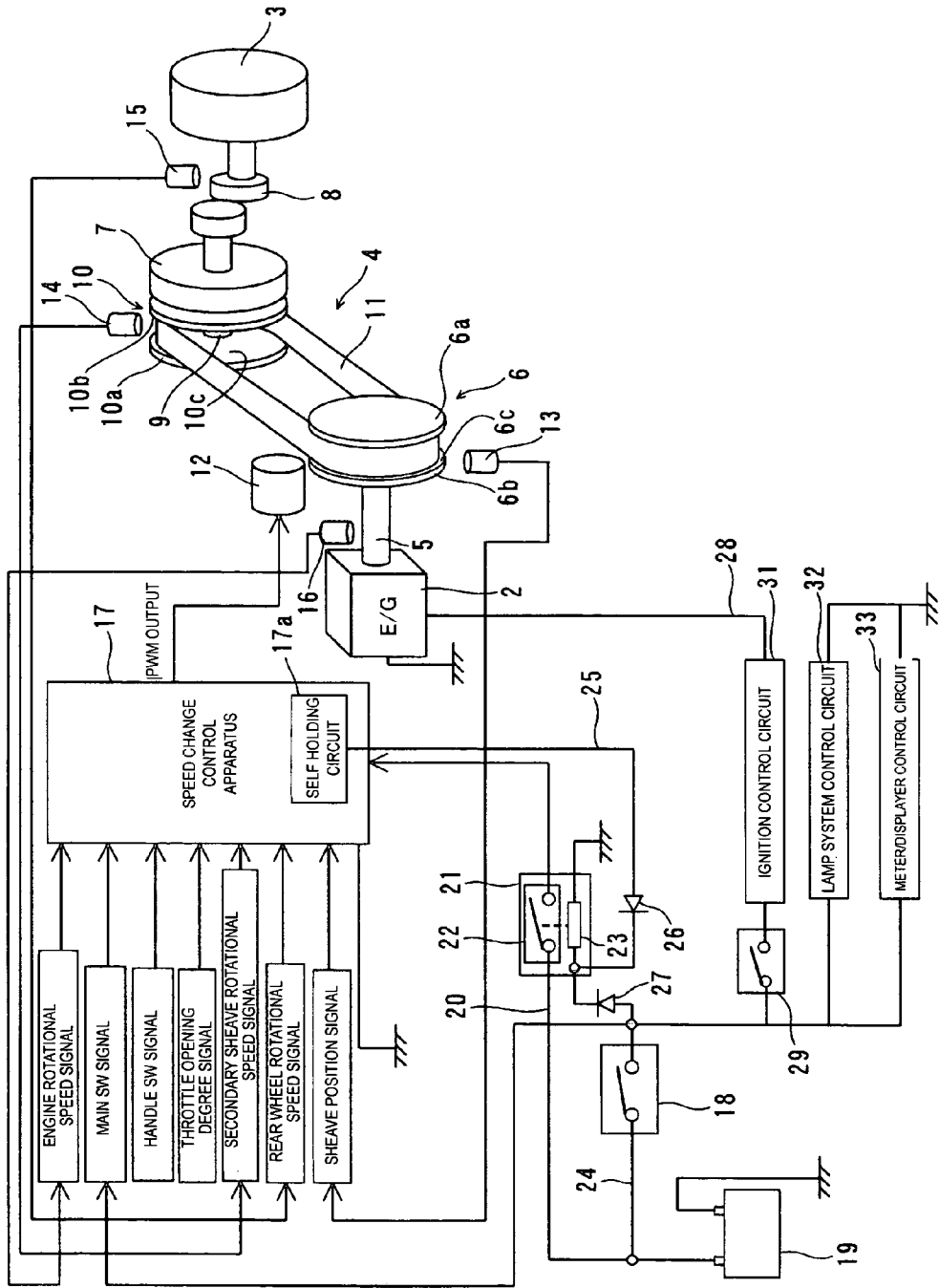
FIG. 2 is a view for explaining a speed change control of a continuously variable transmission of the motorcycle according to the first preferred embodiment shown in FIG. 1.
Figure 3:
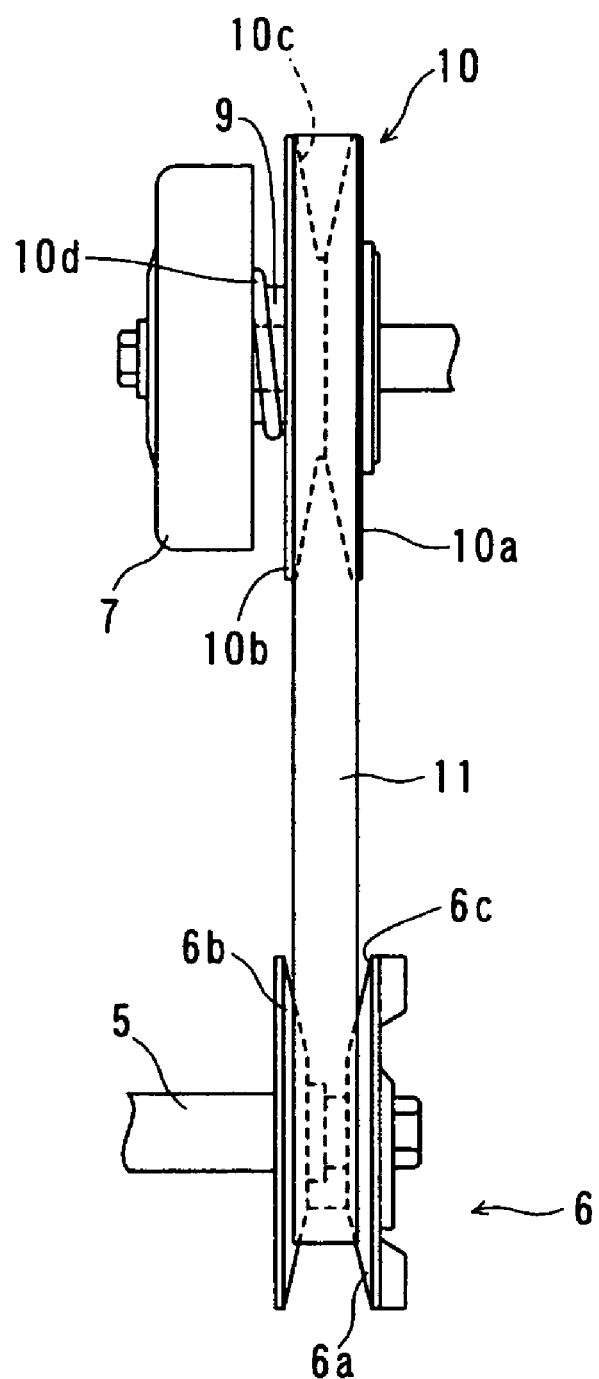
FIG. 3 is a sectional view for explaining a detailed structure of the continuously variable transmission of the motorcycle according to the first preferred embodiment shown in FIG. 1.
Figure 4:
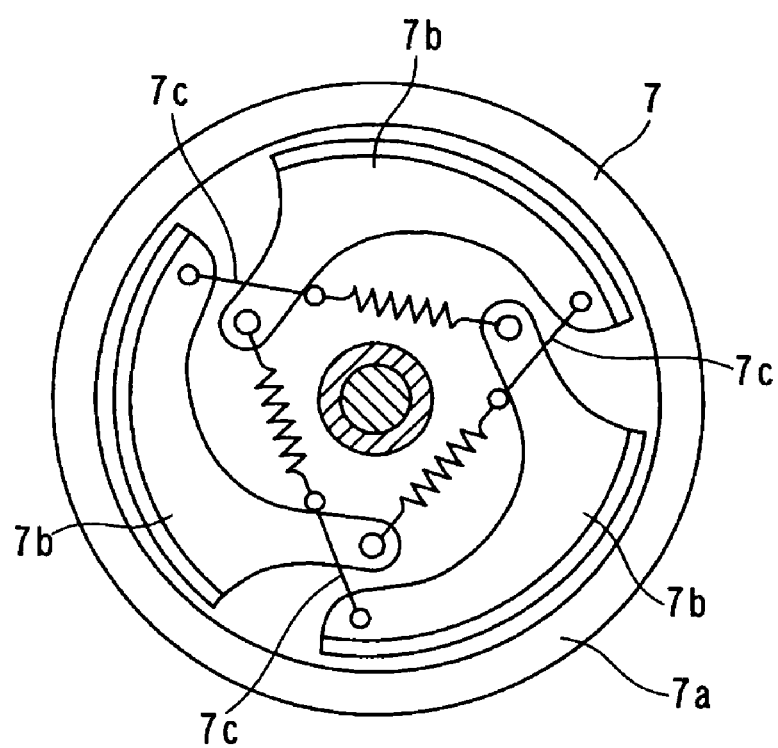
FIG. 4 is a sectional view for explaining a detailed structure of a clutch of the continuously variable transmission of the motorcycle according to the first preferred embodiment shown in FIG. 1.
Figure 5:
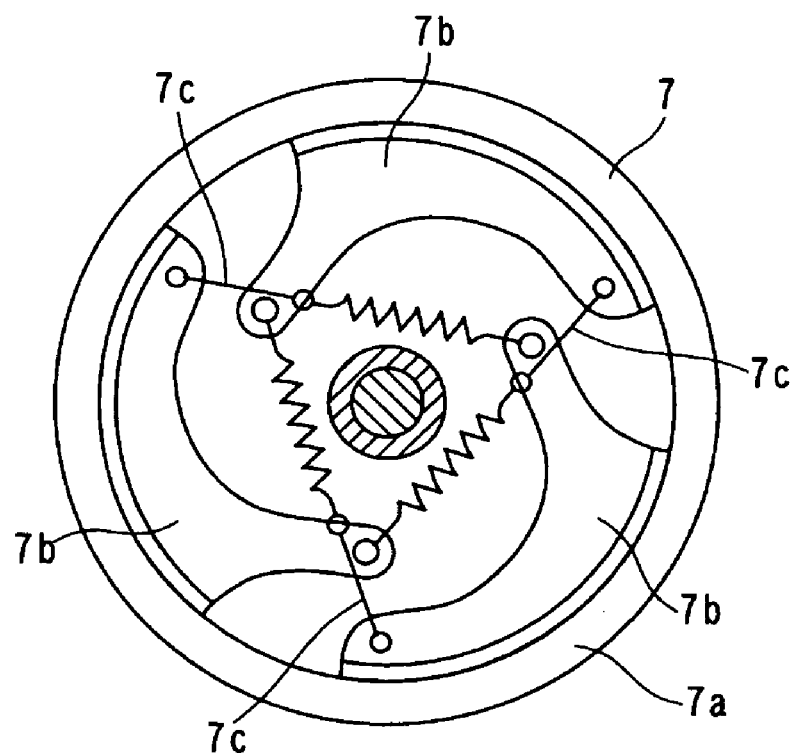
FIG. 5 is a sectional view for explaining the detailed structure of the clutch of the continuously variable transmission of the motorcycle according to the first preferred embodiment shown in FIG. 1.

FIG. 1 is a side view showing an overall structure of a motorcycle according to a first preferred embodiment of the present invention. FIG. 2 is a view for explaining a speed change control of a continuously variable transmission of the motorcycle according to the first preferred embodiment shown in FIG. 1. FIG. 3 through FIG. 5 are views for explaining structures of the continuously variable transmission and a centrifugal clutch of the motorcycle according to the first preferred embodiment shown in FIG. 1. The structure of the motorcycle according to the first preferred embodiment of the present invention will be explained with reference to FIG. 1 through FIG. 5. Further, according to the first preferred embodiment, the motorcycle of a scooter type will be explained as an example of a vehicle according to a preferred embodiment of the present invention.

As shown in FIG. 1, a motorcycle 1 of a scooter type according to the first preferred embodiment is provided with a continuously variable transmission 4 of a V belt type which is electrically controlled as a mechanism of transmitting a drive force from an engine 2 to a rear wheel 3. Further, the engine 2, which is preferably constituted by an internal combustion engine, is an example of a "drive force generating device" of the present invention, and the rear wheel 3 is an example of a "drive wheel" of the present invention. Further, as shown in FIG. 2, the continuously variable transmission 4 includes a primary shaft 5 rotated by the engine 2, a primary sheave 6 connected to the primary shaft 5, a secondary shaft 9 for outputting power to the rear wheel 3 via a centrifugal clutch 7 and a speed reducing mechanism 8, a secondary sheave 10 connected to the secondary shaft 9, and a V belt 11 preferably made of an elastomer of rubber, resin or other suitable material hung between the primary sheave 6 and the secondary sheave 10. Further, the primary sheave 6 is an example of a "first drive force transmitting device" of the present invention and the secondary sheave 10 is an example of a "second drive force transmitting device" of the present invention. Further, the V belt 11 is an example of a "belt member" of the example of a preferred embodiment of the present invention.

Further, as shown in FIG. 2 and FIG. 3, the primary sheave 6 includes a fixed sheave 6a and a movable sheave 6b and the secondary sheave 10 includes a fixed sheave 10a and a movable sheave 10b. Further, V grooves 6c and 10c wound with the V belt 11 are located respectively between the fixed sheave 6a and the movable sheave 6b of the primary sheave 6 and between the fixed sheave 10a and the movable sheave 10b of the secondary sheave 10. Further, the movable sheave 6b is movably arranged in an axial direction of the primary shaft 5 and the movable sheave 10b is arranged movably in an axial direction of the secondary shaft 9. Further, the movable sheave 10b of the secondary sheave 10 is urged to a side of the fixed sheave 10a by a compression coil spring 10d.

Further, as shown in FIG. 2, the drive force of the engine 2 is converted into a force of rotating the V belt 11 by the primary sheave 6, and the force of rotating the V belt 11 is transmitted to the centrifugal clutch 7 via the secondary sheave 10. As shown in FIG. 4, the centrifugal clutch 7 includes a clutch drum 7a, three clutch pieces 7b, and three clutch springs 7c for respectively connecting the three clutch pieces 7b. The clutch drum 7a is connected to the rear wheel 3 via a speed reducing mechanism 8 (refer to FIG. 2). Further, the three clutch pieces 7b (refer to FIG. 4) are connected to the secondary sheave 10 (refer to FIG. 2). Further, as shown in FIG. 4, the clutch pieces 7b are moved close to an inner peripheral surface of the clutch drum 7a by a centrifugal force against an urging force of the clutch spring 7c as a rotational speed of the secondary sheave 10 (refer to FIG. 2) is increased. Further, when the rotational speed of the secondary sheave 10 becomes equal to or larger than a predetermined value, as shown in FIG. 5, the clutch pieces 7b are brought into contact with the inner peripheral surface of the clutch drum 7a and the drive force is transmitted from the secondary sheave 10 (refer to FIG. 2) to the rear wheel 3.

Further, as shown in FIG. 2, the continuously variable transmission 4 is provided with a sheave position moving apparatus 12 for electrically moving a position of the movable sheave 6b of the primary sheave 6 and a sheave position detecting apparatus 13 for detecting the position of the movable sheave 6b. By the sheave position moving apparatus 12, the continuously variable transmission 4 is arranged to adjust a width of the V groove 6c of the primary sheave 6 by moving the movable sheave 6b of the primary sheave 6 in an axial direction of the primary shaft 5. That is, according to the continuously variable transmission 4, only the primary sheave 6 is arranged to be controlled electrically. Thereby, diameters of winding the V belt 11 around the primary sheave 6 and the secondary sheave 10 are changed and therefore, the gear ratio is changed steplessly between the primary sheave 6 and the secondary sheave 10.

Further, the continuously variable transmission 4 is provided with a secondary sheave rotational speed sensor 14 for detecting rotation of the secondary sheave 10. Further, a vicinity of the rear wheel 3 is provided with a rear wheel rotational speed sensor 15 for detecting a rotational speed of the rear wheel 3. By comparing a rotational speed of the secondary sheave 10 detected by the secondary sheave rotational speed sensor 14 and the rotational speed of the rear wheel 3 detected by the rear wheel rotational speed sensor 15, it can be confirmed whether the secondary shaft 9 and the centrifugal clutch 7 are connected. Further, a vicinity of the engine 2 is provided with an engine rotational speed sensor 16 for detecting a rotational speed of the engine 2.

Further, as shown in FIG. 2, the motorcycle 1 is provided with a speed change control apparatus 17 for controlling the gear ratio of the continuously variable transmission 4. Further, the speed change control apparatus 17 is an example of a "speed change controlling device". The speed change control apparatus 17 is constituted by a microcomputer including CPU, a memory and/or other suitable devices. Further, the speed change control apparatus 17 is inputted with a secondary sheave rotational speed signal outputted from the secondary sheave rotational speed sensor 14, a rear wheel rotational speed signal outputted from the rear wheel rotational speed sensor 15, a throttle opening degree signal outputted from a throttle opening degree sensor (not illustrated), a sheave position signal outputted from the sheave position detecting apparatus 13, an engine rotational speed signal outputted from the engine rotational speed sensor 16, and a main switch signal of a main switch 18 for turning a power source system of a total of the vehicle ON/OFF. Further, the main switch 18 is an example of a "first switch" of the present invention. Further, the change speed control apparatus 17 controls the continuously variable transmission 4 based on the above-described respective signals. Further, the speed change control apparatus 17 is provided with a self holding circuit 17a. The self holding circuit 17a is provided for maintaining to supply power to the speed change control apparatus 17 even when a driver cuts the main switch 18 while the motorcycle is running.

Further, as shown in FIG. 2, the speed change control apparatus 17 is supplied with power from a vehicle-mounted power source 19 via a power supply line 20. The power supply line 20 can supply power from the vehicle-mounted power source 19 to the speed change control apparatus 17 independently from the main switch 18. Further, the vehicle-mounted power source 19 is an example of a "power supply" of the present invention.

According to the first preferred embodiment of the present invention, the power supply line 20 is provided with a relay circuit 21 having a self holding function. The relay circuit 21 is provided with a relay switch 22 for controlling the supply power from the vehicle-mounted power source 19 to the speed change control apparatus 17, and a switch control element 23 for controlling ON/OFF of the relay switch 22. Further, the relay switch 22 is an example of a "second switch" of the present invention. Further, there is provided a switch line 24 capable of applying a voltage from the vehicle-mounted power source 19 to the control switch element 23 via the main switch 18 between the vehicle-mounted power source 19 and the switch control element 23.

Further, the first preferred embodiment is provided with a switch line 25 for maintaining the relay switch 22 in a closed state (ON state) by applying the voltage to the switch control element 23 even when the main switch 18 is turned OFF between the switch control element 23 and the self holding circuit 17a. Further, the self holding circuit 17a of the speed change control apparatus 17 is arranged to apply the voltage to the switch control element 23 via the switch line 25 when power is supplied from the vehicle-mounted power source 19 to the power supply line 20. That is, according to the first preferred embodiment, the voltage can be applied to the switch control element 23 from two routes of lines of the switch line 24 by way of the main switch 18 and the switch line 25 by way of the self holding circuit 17a. Further, the switch line 25 is provided with a diode 26 for preventing a current from flowing back to the self holding circuit 17a and preventing an inverse current from flowing to the self holding circuit 17a via the switch line 25 when the main switch 18 is turned ON/OFF. Further, there is provided a diode 27 for preventing a current from flowing from the switch line 25 to a side of the main switch 18 (main switch signal line) when the main switch 18 is turned OFF at a portion of the switch line 24 between the main switch 18 and the switch control element 23.

Further, the switch control element 23 is arranged to maintain the relay switch 22 in the closed state (ON state) when the voltage is applied from either one of the switch line 24 and the switch line 25. Further, the switch control element 23 is arranged to bring the relay switch 22 into an open state (OFF state) when the voltage is not applied from either of the switch line 24 and the switch line 25.

Further, a switch line 28 is provided between a portion of the switch line 24 between the main switch 18 and the relay circuit 21 and the engine 2. The switch line 28 is provided with an ignition control circuit 31 for controlling an operation to ignite an ignition plug, and a switch 29 for stopping the engine 2 by stopping the supply of power to the ignition control apparatus 31 when an emergency occurs. Thereby, even when the main switch 18 is brought into the ON state, by cutting the switch 29, the engine 2 can be stopped. Further, a portion of the switch line 24 between the main switch 18 and the relay circuit 21 is connected with a lamp system control circuit 32 for lighting a headlamp or the like, and a meter/displayer control circuit 33 for controlling instruments. Thereby, power is supplied from the vehicle-mounted power source 19 to the lamp system control circuit 32 and the meter/displayer control circuit 33 via the switch line 24 only when the main switch 18 is brought into the ON state.

Figure 6:
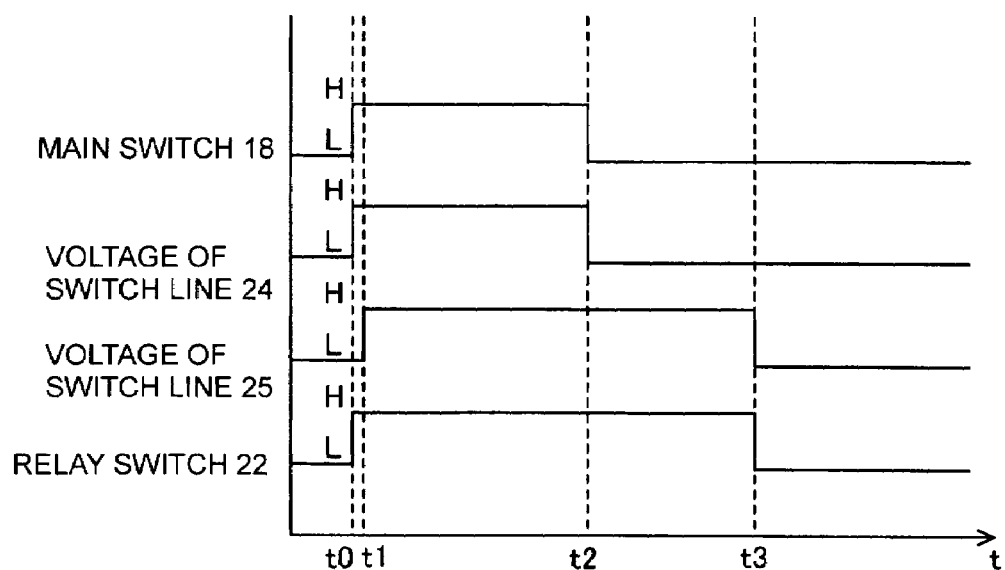
FIG. 6 is a timing chart showing a state of a relay switch and a voltage of a switch line when a main switch is turned OFF in a state in which a vehicle speed of the motorcycle according to the first preferred embodiment shown in FIG. 1 is greater than 0 km/h (running state).
Figure 7:
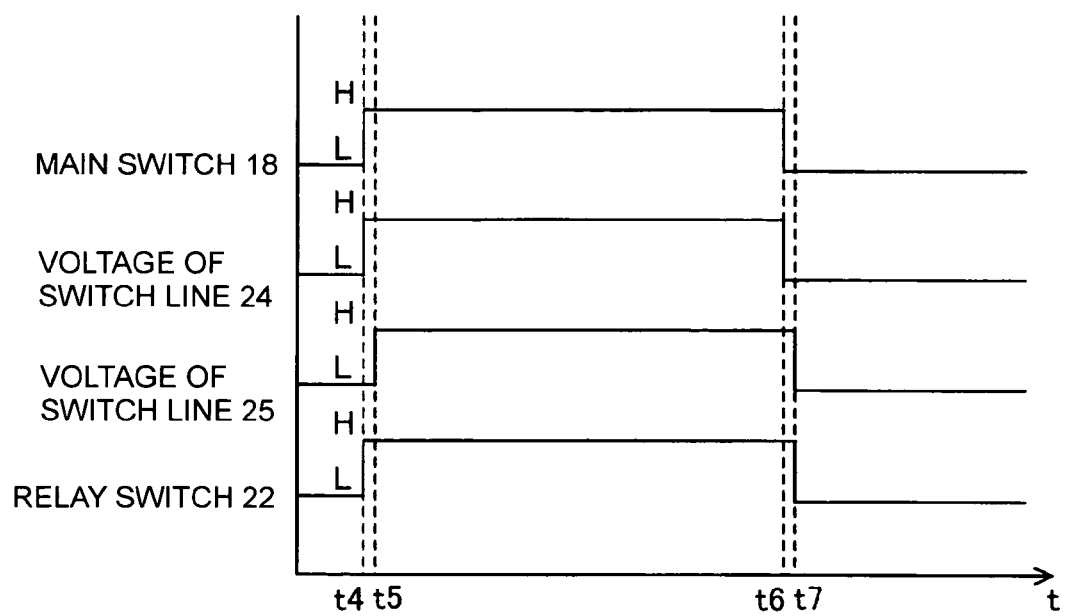
FIG. 7 is a timing chart showing a state of the relay switch and the voltage of the switch line when the main switch is turned OFF in a state in which the vehicle speed of the motorcycle according to the first preferred embodiment shown in FIG. 1 is 0 km/h (stationary state).

FIG. 6 is a timing chart showing a state of the relay switch and voltages of the switch lines when the main switch is turned OFF in a state in which the vehicle speed of the motorcycle according to the first preferred embodiment shown in FIG. 1 is greater than 0 km/h (running state), and FIG. 7 is a timing chart showing the state of the relay switch and the voltages of the switch lines when the main switch is turned OFF in a state in which the vehicle speed of the motorcycle according to the first preferred embodiment shown in FIG. 1 is 0 km/h (stationary state). Further, in the timing charts of FIG. 6 and FIG. 7, with regard to the main switch 18 and the relay switch 22, a state of an H level indicates an ON state and a state of an L level indicates an OFF state. Further, with regard to the voltage of the switch line 24 and the voltage of the switch line 25, a state of an H level indicates a state in which a voltage is applied to the switch control element 23 and a state of an L level indicates a state in which the switch control element 23 is not applied with a voltage.

First, an explanation will be given of a case in which the main switch 18 is turned OFF in the state (running state) in which the vehicle speed is greater than 0 km/h in reference to FIG. 2 and FIG. 6. As shown in FIG. 6, when the main switch 18 is turned ON at time t0 when starting the engine, the main switch signal (refer to FIG. 2) is supplied to the speed change control apparatus 17, and a voltage is applied from the vehicle-mounted power source 19 to the switch control element 23 via the switch line 24. Thereby, the relay switch 22 is brought into the ON state and therefore, power is supplied to the speed change control apparatus 17. Further, when power is supplied to the speed change control apparatus 17, a voltage is applied from the self holding circuit 17a to the switch control element 23 via the switch line 25 at substantially the same time t1. Thereafter, when the main switch 18 is switched to OFF at time t2 during running of the motorcycle 1, the voltage is stopped from being supplied to the switch control element 23 via the switch line 24, and the main switch signal is stopped from being supplied to the speed change control apparatus 17. At the time of turning the main switch 18 OFF, the voltage is continuously supplied from the self holding circuit 17a to the switch control element 23 via the switch line 25 and therefore, the switch control element 23 maintains the relay switch 22 in the closed state (ON state). Further, the vehicle speed is calculated based on the rear wheel rotational speed signal or the secondary sheave rotational speed signal. In this case, even when the main switch 18 is cut, since the vehicle is running, the vehicle speed is greater than 0 km/h. Further, in this case, according to the first preferred embodiment, the voltage is continued to be supplied from the self holding circuit 17a to the switch control element 23. Thereafter, at a time point (time t3) at which the vehicle speed becomes 0 km/h, the voltage is stopped being supplied from the self holding circuit 17a to the switch control element 23. As a result, the relay switch 22 is brought into the open state (OFF state) and therefore, power is stopped being supplied from the vehicle-mounted power source 19 to the speed change control apparatus 17 via the power supply line 20 and control of the continuously variable transmission 4 of the speed change control apparatus 17 is stopped.

Next, an explanation will be given of a case in which the main switch 18 is turned OFF in a state in which the vehicle speed is 0 km/h (stationary state) in reference to FIG. 2 and FIG. 7. As shown in FIG. 7, when the main switch 18 is turned ON at time t4 while starting the engine, the main switch signal (refer to FIG. 2) is supplied to the speed change control apparatus 17 and the voltage is supplied from the vehicle-mounted power source 19 to the switch control element 23 via the switch line 24. As a result, the relay switch 22 is brought into the ON state and therefore, power is supplied to the speed change control apparatus 17. Further, when power is supplied to the speed change control apparatus 17, the voltage is supplied from the self holding circuit 17a to the switch control element 23 via the switch line 25 at substantially the same time t5. Thereafter, when the main switch 18 is switched to OFF at time t6 in the stationary state after finishing the running of the motorcycle 1, the voltage is stopped being supplied to the switch control element 23 via the switch line 24, and the main switch signal is stopped being supplied to the speed change control apparatus 17. At a time point at which the main switch 18 is turned OFF (time t6), the voltage continues to be supplied from the self holding circuit 17a to the switch control element 23 via the switch line 25 and therefore, the switch control element 23 maintains the relay switch 22 in the closed state (ON state). Further, the vehicle speed is calculated based on the rear wheel rotational speed signal or the secondary sheave rotational speed signal. In this case, since the vehicle speed is 0 km/h, at time t7 substantially the same as time t6, the voltage is stopped being supplied from the self holding circuit 17a to the switch control element 23. Thereby, the relay switch 22 is brought into the open state (OFF state) and therefore, power is stopped being supplied from the vehicle-mounted power source 19 to the vehicle speed control apparatus 17 via the power supply line 20 and control of the continuously variable transmission 4 of the speed change control apparatus 17 is stopped.

Figure 8:
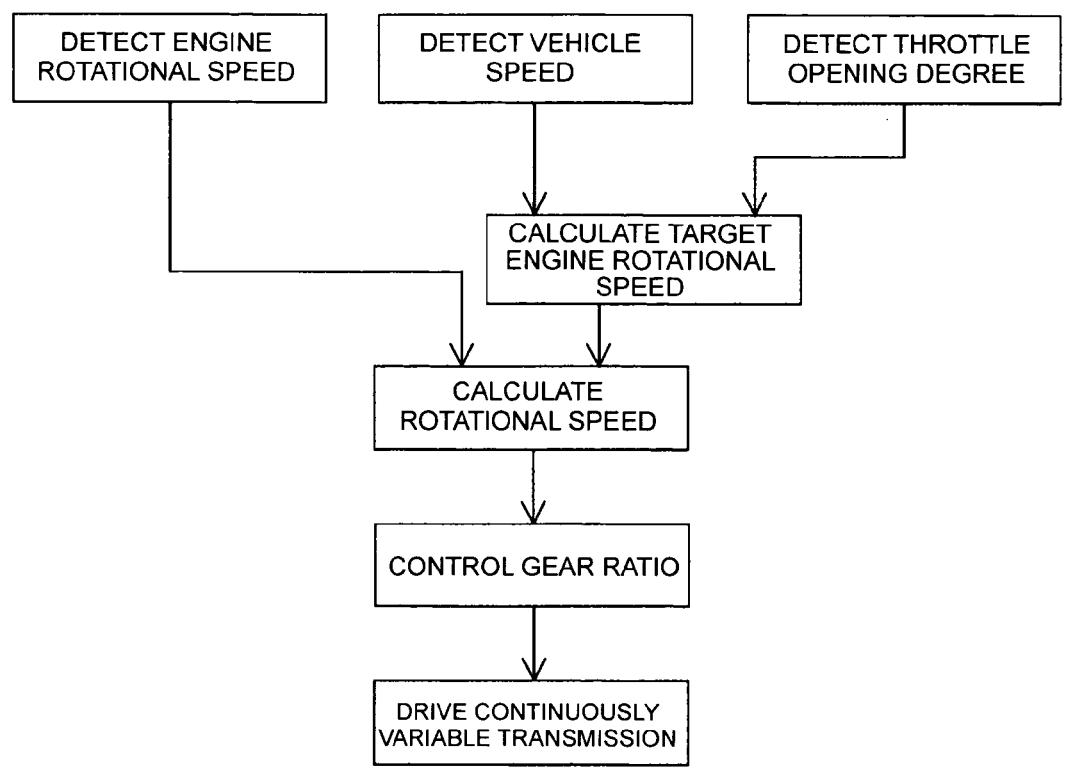
FIG. 8 is a diagram for explaining a method of controlling the continuously variable transmission of a speed change control apparatus of the motorcycle according to the first preferred embodiment shown in FIG. 1.
Figure 9:
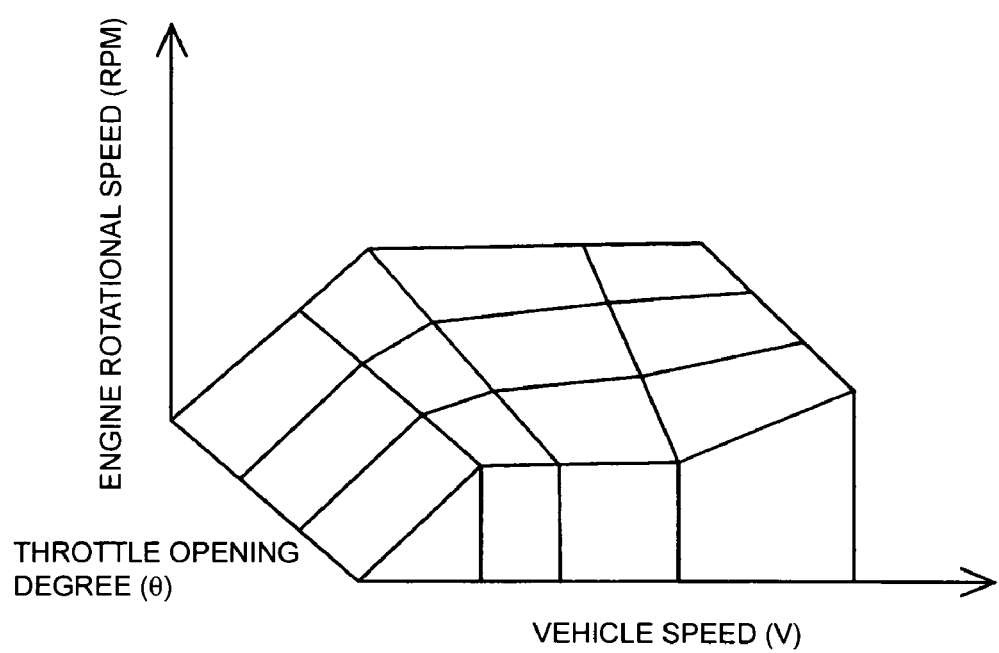
FIG. 9 is a diagram showing a three-dimensional control map of the speed change control apparatus of the motorcycle according to the first preferred embodiment shown in FIG. 1.
Figure 10:
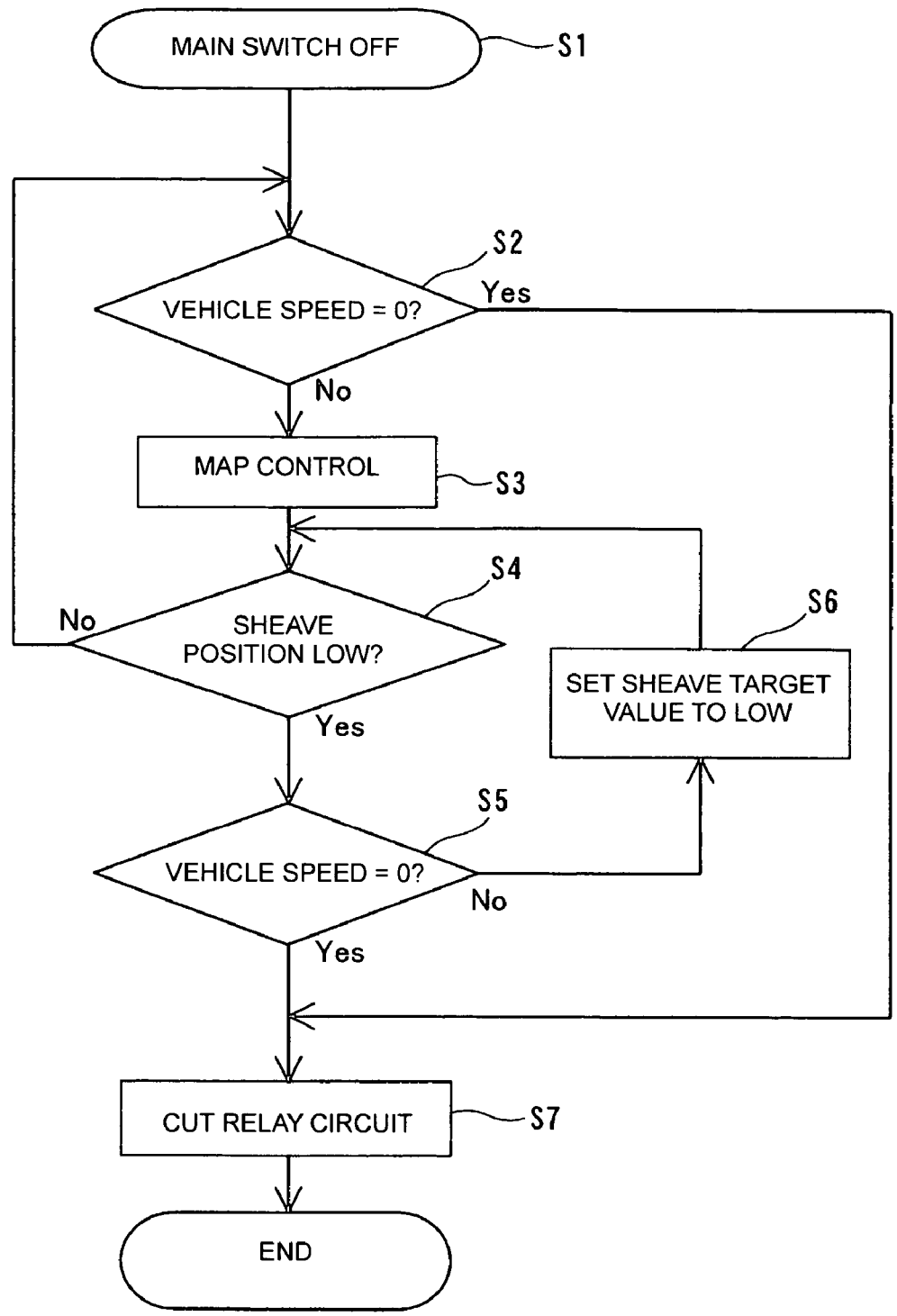
FIG. 10 is a diagram showing a processing flow of the speed change control apparatus when the main switch is turned OFF according to the first preferred embodiment shown in FIG. 1.

FIG. 8 is a diagram for explaining a method of controlling the continuously variable transmission of the speed change control apparatus of the motorcycle according to the first preferred embodiment shown in FIG. 1, and FIG. 9 is a diagram indicating a three-dimensional control map of the speed change control apparatus of the motorcycle according to the first preferred embodiment shown in FIG. 1. FIG. 10 is a diagram showing a processing flow of the speed change control apparatus when the main switch according to the first preferred embodiment shown in FIG. 1 is turned OFF. Next, a detailed explanation will be given of operation of the speed change control apparatus 17 according to the first preferred embodiment of the present invention in reference to FIG. 2 and FIG. 8 through FIG. 10.

Further, in the following explanation, at a time point at which the main switch 18 is turned OFF, supply of power to the ignition control circuit 31 is stopped so as to stop the engine 2. Further, during a predetermined time period immediately after stopping operation of the engine 2, a crankshaft of the engine 2 and the primary shaft 5 are rotated by inertia and therefore, the primary sheave 6 and the secondary sheave 10 are rotated. Thereby, until the vehicle speed becomes equal to or smaller than a predetermined value, the gear ratio can be changed in a state of bringing the V belt 11 into close contact with the primary sheave 6 and the secondary sheave 10.

At step S1 shown in FIG. 10, when the main switch 18 is turned OFF, the main switch signal (refer to FIG. 2) is not supplied to the speed change control apparatus 17. Further, at step S2, it is determined whether the vehicle speed is 0 km/h. At step S2, when it is determined that the vehicle speed is 0 km/h (stationary state), at step S7, by bringing the relay switch 22 from the closed state (ON state) to the open state (OFF state) by stopping the supply of voltage from the self holding circuit 17a to the switch control element 23 via the switch line 25, the relay circuit 21 is cut and the processing is finished. Thereby, power supply from the vehicle-mounted power source 19 to the speed change control apparatus 17 is cut and the speed change control of the speed change control apparatus 17 is stopped. Further, at step S2, when it is determined that the vehicle speed is not 0 km/h (running state), at step S3, a map control is carried out. Since the vehicle speed is going to be reduced, the gear ratio is changed to be low. Specifically, the vehicle speed is calculated based on the rear rotational speed signal outputted by the rear wheel rotational speed rotational sensor 15. A target engine rotational speed is calculated from the calculated vehicle speed and the throttle opening degree signal based on the three-dimensional control map shown in FIG. 9. Here, the three-dimensional control map is previously prepared from the engine rotational speed, the vehicle speed and the throttle opening degree. As shown in FIG. 9, the three-dimensional control map designates the vehicle speed (V) at an abscissa, the throttle opening degree (θ) at an axis directed in the depth direction, and the engine rotational speed (rpm) at the ordinate, and the target engine rotational speed can be calculated from the vehicle speed and the throttle opening degree by the three-dimensional control map. Further, as shown in FIG. 8, the gear ratio is calculated from the target engine rotational speed and an actual engine rotational speed provided from the engine rotational speed sensor 16 (refer to FIG. 2). Further, the gear ratio is controlled based on the calculated gear ratio and the continuously variable transmission 4 is driven. Specifically, a moving amount of the sheave position moving apparatus 12 is determined based on the calculated gear ratio. Further, a target position of the movable sheave 6b of the primary sheave 6 is determined based on the determined moving amount, the movable sheave 6b of the primary sheave 6 is moved by using the sheave position moving apparatus 12 and the gear ratio is close to the low state.

Thereafter, at step S4, it is determined whether the sheave position becomes low. When it is determined that the sheave position is not low at step S4, the operation returns to step S2 and continues to control the gear ratio by the three-dimensional control map until the vehicle speed becomes 0 km/h. On the other hand, when it is determined that the sheave position becomes low at step S4, the operation proceeds to step S5. At step S5, it is determined whether the vehicle speed becomes 0 km/h, and when it is determined that the vehicle speed does not become 0 km/h, at step S6, a sheave target value is set to be low and the speed change control continues. Further, determinations at step S4 and step S5 are repeated. In this case, the speed change control apparatus 17 maintains the gear ratio in the low state until the vehicle speed becomes 0 km/h. Thereafter, when the vehicle speed becomes 0 km/h, at step S5, it is determined that the vehicle speed is 0 km/h, and at step S7, the relay circuit 21 is cut and the processing is finished.

According to the first preferred embodiment, as described above, the speed change control apparatus 17 for continuously controls the gear ratio of the continuously variable transmission 4 after the engine 2 is instructed to stop by turning the main switch 18 OFF. Thereby, even after the engine 2 is instructed to stop by turning the main switch 18 OFF by a driver during running of the motorcycle, the gear ratio of the continuously variable transmission 4 can continuously be controlled by the self holding circuit 17a of the speed change control apparatus 17 and therefore, the gear ratio of the continuously variable transmission 4 can be made to be close to the low state during running of the motorcycle (before stopping). Thereby, during a starting operation the next time, the engine 2 can be started in a state of being low or being close to low and therefore, a load on the engine 2 is reduced and the engine can be started smoothly. Further, even after the engine 2 is instructed to stop by turning the main switch 18 OFF in running, the continuously variable transmission 4 can be made to be close to the low state during running of the motorcycle (before stopping) and therefore, during a starting operation the next time after stopping, it is not necessary to return the gear ratio of the continuously variable transmission 4 to low. As a result, a time period until starting the vehicle after the starting operation can be shortened. Further, by continuing to control the gear ratio of the continuously variable transmission 4 after instructing the engine 2 to stop, even after the engine 2 is instructed to stop by turning the main switch 18 OFF during running of the motorcycle, the vehicle can be run by inertia while executing the speed change control to the lower range by the speed change control apparatus 17. Consequently, even after the engine 2 is instructed to stop, the vehicle can be run in a state in which it is very easy to operate the engine brake and therefore, operability is greatly improved.

Further, according to the first preferred embodiment, after the engine 2 is instructed to stop by turning the main switch 18 OFF, when the vehicle speed is greater than 0 km/h, based on the three-dimensional control map for the speed change control, the continuously variable transmission 4 is controlled by the map such that the gear ratio of the continuously variable transmission 4 becomes low. As a result, even after instructing to stop the engine 2 by turning the main switch 18 OFF during running of the motorcycle, easily, the gear ratio of the continuously variable transmission 4 can be made to be close to the low state by using the three-dimensional control map.

Further, according to the first preferred embodiment, after instructing the engine 2 to stop by turning the main switch 18 OFF, when the gear ratio becomes low, until the vehicle speed becomes 0 km/h, the gear ratio of low is maintained. After turning the main switch 18 OFF, when the gear ratio is continued to be controlled, in the case in which a road is oriented downhill, owing to an increase in the vehicle speed, there is a case in which the gear ratio is varied from a lower range to an upper range. According to the first preferred embodiment, the gear ratio is set to low and therefore, the engine brake can further excellently be operated in comparison with a case of varying the gear ratio to the upper range. Thereby, the vehicle speed can further be prevented from being increased and therefore, the operability of the driver is even more improved.

Further, according to the first preferred embodiment, by arranging the speed change control apparatus 17 such that the relay switch 22 is brought into the OFF state when the vehicle speed becomes 0 km/h, the gear ratio of the continuously variable transmission 4 can be made to be close to the low state until stopping the motorcycle 1 and therefore, the gear ratio of the continuously variable transmission 4 can further be made to be close to the low state. Further, by arranging the speed change control apparatus 17 such that the relay switch 22 is brought into the OFF state when the vehicle speed becomes 0 km/h, supply of power from the vehicle-mounted power source 19 to the speed change control apparatus 10 is cut and therefore, when the vehicle speed becomes 0 km/h, the control of the gear ratio by the speed change control apparatus 17 can be stopped easily.

Second Preferred Embodiment

Figure 11:
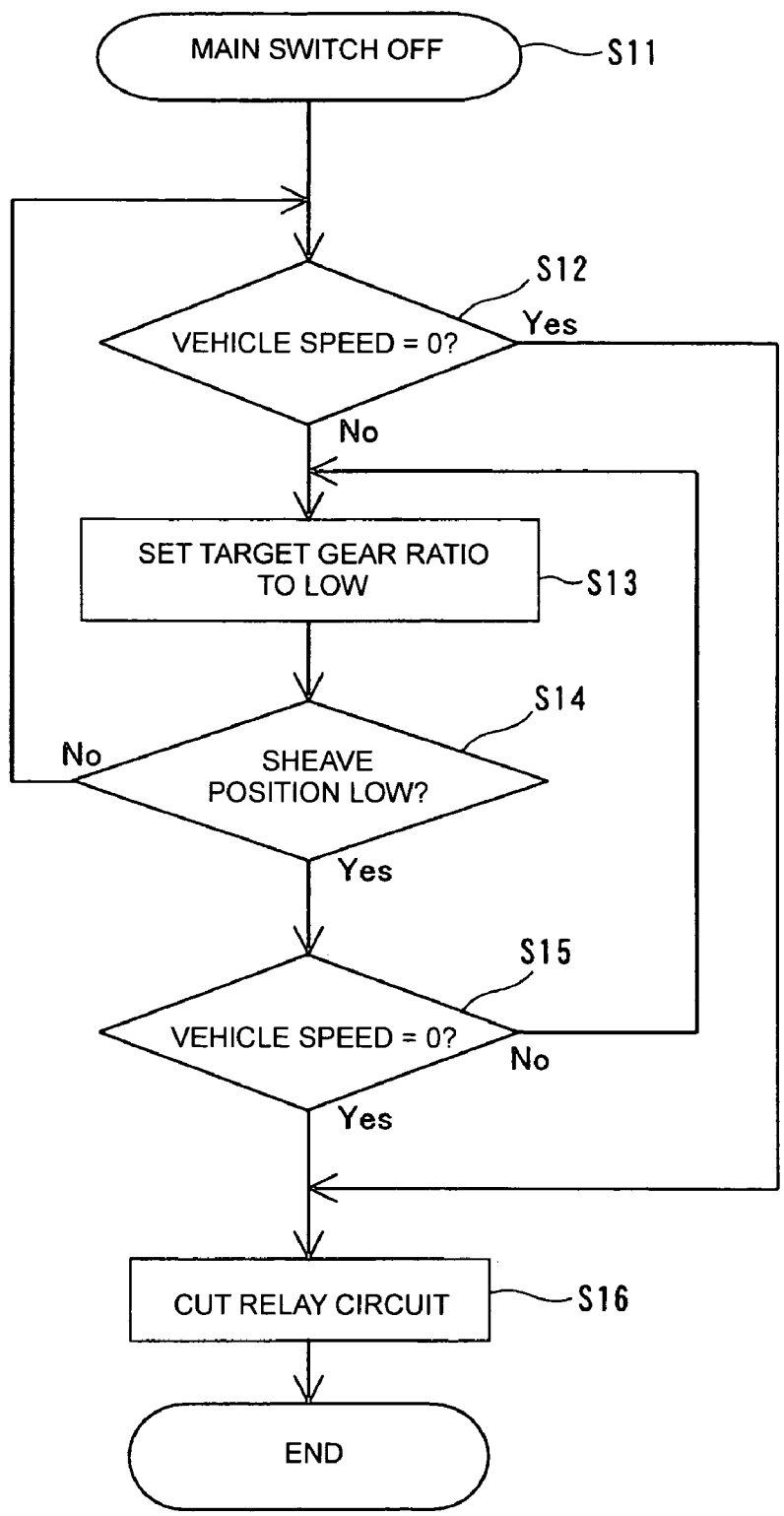
FIG. 11 is a diagram showing a processing flow of a speed change control apparatus when the main switch is turned OFF according to a second preferred embodiment of the present invention.

FIG. 11 is a diagram showing a processing flow of a speed change control apparatus when the main switch is turned OFF according to a second preferred embodiment of the present invention. According to the second preferred embodiment, different from the above-described first preferred embodiment, an explanation will be given of an example of setting the target gear ratio to low without executing the map control when the main switch 18 is turned OFF. Further, other features of the second preferred embodiment are preferably similar to those of the first preferred embodiment. An explanation will be given of operation of the speed change control apparatus 17 according to the second preferred embodiment of the invention with reference to FIG. 2 and FIG. 11.

At step S11 shown in FIG. 11, when the main switch 18 is turned OFF, the main switch signal (refer to FIG. 2) is not supplied to the speed change control apparatus 17. Further, at step S12, it is determined whether the vehicle speed is 0 km/h. At step S12, when it is determined that the vehicle speed is 0 km/h (stationary state), at step S16, by bringing the relay switch 22 from the closed state (ON state) to the open state (OFF state) by stopping the supply of voltage from the self holding circuit 17a to the switch control element 23 via the switch line 25, the relay circuit 21 is cut and the processing is finished. Thereby, supply of power from the vehicle-mounted power source 19 to the speed change control apparatus 17 is cut and the speed change control of the speed change control apparatus 17 is stopped. Further, at step S12, when it is determined that the vehicle speed is not 0 km/h (running state), at step S13, the target gear ratio (sheave target value) is fixedly set to low. Thereby, the movable sheave 6b of the primary sheave 6 is immediately moved to the low position by using the sheave position moving apparatus 12.

Thereafter, at step S14, it is determined whether the sheave position becomes low. When it is determined that the sheave position does not become low at step S14, the operation returns to step S12, and when it is determined that the sheave position becomes low at step S14, the operation proceeds to step S15. At step S15, it is determined whether the vehicle speed becomes 0 km/h, and when it is determined that the vehicle speed does not become 0 km/h, the operation returns to step S13, and determinations at step S14 and step s15 are repeated. In this case, the speed change control apparatus 17 maintains the gear ratio to be low until the vehicle speed becomes 0 km/h. Thereafter, when the vehicle speed becomes 0 km/h, at step S15, it is determined that the vehicle speed becomes 0 km/h, at step S16, the relay circuit 21 is cut and the processing is finished.

According to the second preferred embodiment, as described above, after instructing the engine 2 to stop by turning the main switch 18 OFF, when the vehicle speed is greater than 0 km/h, by setting the target gear ratio (sheave target value) of the continuously variable transmission 4 to low, in comparison with the case of using the map control, the gear ratio of the continuously variable transmission 4 can quickly be changed to be close to the low state.

Further, other effects and advantages of the second preferred embodiment are similar to those of the first preferred embodiment. That is, also in the second preferred embodiment, similar to the first preferred embodiment, there is provided the speed change control apparatus 17 for continuously controlling the gear ratio of the continuously variable transmission 4 after instructing the engine 2 to stop by turning the main switch 18 OFF. Thereby, when a driver turns the main switch 18 OFF during running of the motorcycle, the gear ratio can be set effectively.

Third Preferred Embodiment

Figure 12:
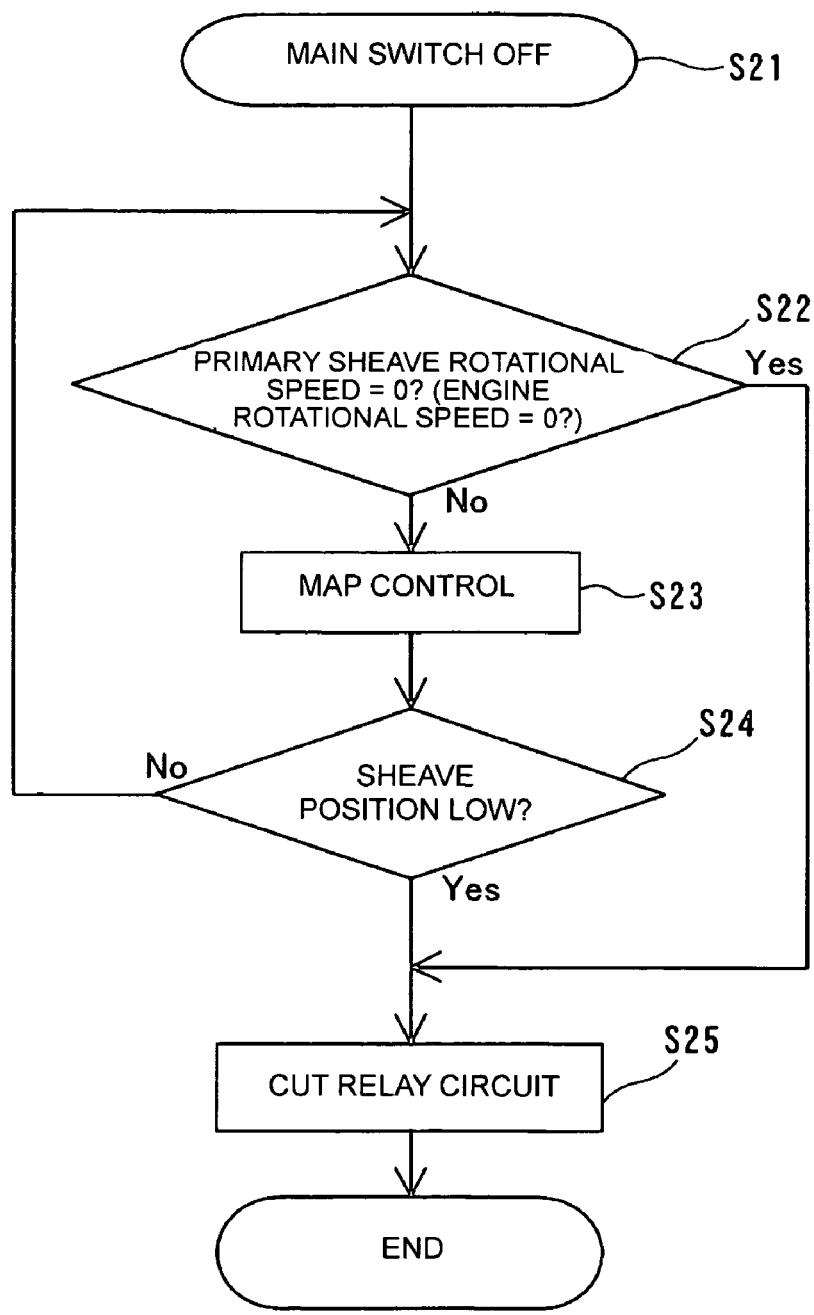
FIG. 12 is a diagram showing a processing flow of a speed change control apparatus when the main switch is turned OFF according to a third preferred embodiment of the present invention.

FIG. 12 is a diagram showing a processing flow of a speed change control apparatus when the main switch is turned OFF according to a third preferred embodiment of the present invention. According to the third preferred embodiment, different from the case of controlling the gear ratio based on the vehicle speed explained in the above-described first and second preferred embodiments, an explanation will be given of a case of controlling the gear ratio based on the rotational speed of the primary sheave 6 detected from the engine rotational speed. Further, the other features and arrangements of the third preferred embodiment are similar to those of the first preferred embodiment.

An explanation will be given of operation of the speed change control apparatus 17 according to the third preferred embodiment of the present invention with reference to FIG. 2 and FIG. 12 as follows.

At step S21 shown in FIG. 12, when the main switch 18 (refer to FIG. 2) is turned OFF, the main switch signal is not supplied to the speed change control apparatus 17. Further, at step S22, it is determined whether the rotational speed of the primary sheave 6 is 0 rpm. Further, according to the third preferred embodiment, the rotational speed of the primary sheave 6 is detected based on the engine rotational speed signal from the engine rotational speed sensor 16. That is, according to the third preferred embodiment, the rotational speed of the primary sheave 6 is detected indirectly by detecting the engine rotational speed. At step S22, when it is determined that the rotational speed of the primary sheave 6 is 0 rpm, at step S25, by bringing the relay switch 22 from the closed state (ON state) to the open state (OFF state) by stopping the supply of voltage from the self holding circuit 17a to the switch control element 23 via the switch line 25, the relay circuit 21 is cut and the processing is finished. As a result, supply of power from the vehicle-mounted power source 19 to the speed change control apparatus 17 is cut and the speed change control of the speed change control apparatus 17 is stopped. Further, at step S22, when it is determined that the rotational speed of the primary sheave 6 is not 0 rpm, at step S23, by a map control similar to that of the above-described first preferred embodiment, the gear ratio is changed to low.

Thereafter, at step S24, it is determined whether the sheave position becomes low. When it is determined that the sheave position does not become low at step S24, the operation returns to step S22, and when it is determined that the sheave position becomes low at step S24, the operation proceeds to step S25. At step S25, the relay circuit 21 is cut and the processing is finished.

According to the third preferred embodiment, as described above, by constructing the constitution such that the gear ratio of the continuously variable transmission 4 is not controlled when rotation of the primary sheave 6 being indirectly detected by the engine rotational speed is stopped, after stopping to rotate the primary sheave 6, the gear ratio of the continuously variable transmission 4 is not controlled and therefore, the gear ratio of the continuously variable transmission 4 can be restrained from being controlled after stopping to rotate the primary sheave 6. Thereby, the problem with the V belt 11 being loosened by moving only the sheave of the primary sheave 6 to the low side in a state of stopping the secondary sheave 10 can be reliably prevented because the gear ratio of the continuously variable transmission 4 is controlled after stopping rotation of the primary sheave 6 and the secondary sheave 10. As a result, damage to the V belt 11 when the engine is restarted in a state of loosening the V belt 11 is prevented.

Further, according to the third preferred embodiment, the centrifugal clutch 7 is preferably provided between the secondary sheave 10 and the rear wheel 3. By arranging the centrifugal clutch 7 in this way, when the rotational speed of the centrifugal clutch 7 becomes equal to or smaller than a predetermined rotational speed, the centrifugal clutch 7 is not provided with a function of transmitting the drive force and therefore, whereas rotation of the primary sheave 6 and the secondary sheave 10 is stopped, the motorcycle 1 continues to be run. In this case, when the gear ratio is continued to be controlled until the vehicle speed becomes equal to a predetermined value or smaller after stopping rotation of the primary sheave 6 and the secondary sheave 10, even after stopping the primary sheave 6 and the secondary sheave 10, the gear ratio of the continuously variable transmission 4 is controlled and therefore, the V belt 11 is loosened by moving only the primary sheave 6 to the low side in the state of stopping the secondary sheave 10 as described above. Therefore, particularly, when the centrifugal clutch 7 is provided, by controlling the gear ratio of the continuously variable transmission 4 by indirectly detecting rotation of the primary sheave 6 from the engine rotational speed as in the third preferred embodiment, it is effective to prevent the V belt 11 from being loosened by preventing the gear ratio of the continuously variable transmission 4 from being controlled when the rotational speed of the primary sheave 6 becomes 0 rpm. Further, in the case of arranging the centrifugal clutch 7 between the secondary sheave 10 and the rear wheel 3 as in the third preferred embodiment, when the rotational speed of the centrifugal clutch 7 becomes equal to or smaller than the predetermined rotational speed, the centrifugal clutch 7 is not provided with the function of transmitting the drive force of the secondary sheave 10 to the rear wheel 3 and therefore, when the rotational speed of the centrifugal clutch 7 becomes equal to or smaller than the predetermined rotational speed, the rotational speed of the secondary sheave 10 (continuously variable transmission 4) cannot be detected by detecting rotation of the rear wheel 3. In this case, it is effective to detect the rotational speed of the continuously variable transmission 4 by indirectly detecting rotation of the primary sheave 6 by detecting rotation of the engine 2 as described above.

Further, according to the third preferred embodiment, similar to the above-described first and second preferred embodiments, the V belt 11 of the belt type continuously variable transmission 4 is preferably made of an elastomer of rubber, resin or other suitable material. The V belt 11 made of elastomer is liable to be damaged when the V belt 11 is loosened. Therefore, the gear ratio of the continuously variable transmission 4 is prevented from being controlled when the rotational speed of the primary sheave 6 becomes 0 rpm by using the constitution of controlling the gear ratio of the continuously variable transmission 4 by indirectly detecting the rotational speed of the primary sheave 6 by the engine rotational speed as in the above-described third preferred embodiment. As a result, a tension of the V belt 11 can be effectively maintained and therefore, the V belt 11 can be prevented from being damaged due to loosening of the V belt 11.

Further, other features and advantages of the third preferred embodiment are similar to those of the first preferred embodiment. That is, also according to the third preferred embodiment, similar to the first preferred embodiment, there is provided the speed change control apparatus 17 for continuously controlling the gear ratio of the continuously variable transmission 4 after instructing to stop the engine 2 by turning the main switch 18 OFF. As a result, when the driver turns the main switch 18 OFF during running of the motorcycle, the gear ratio can be set effectively.

Fourth Preferred Embodiment

Figure 13:
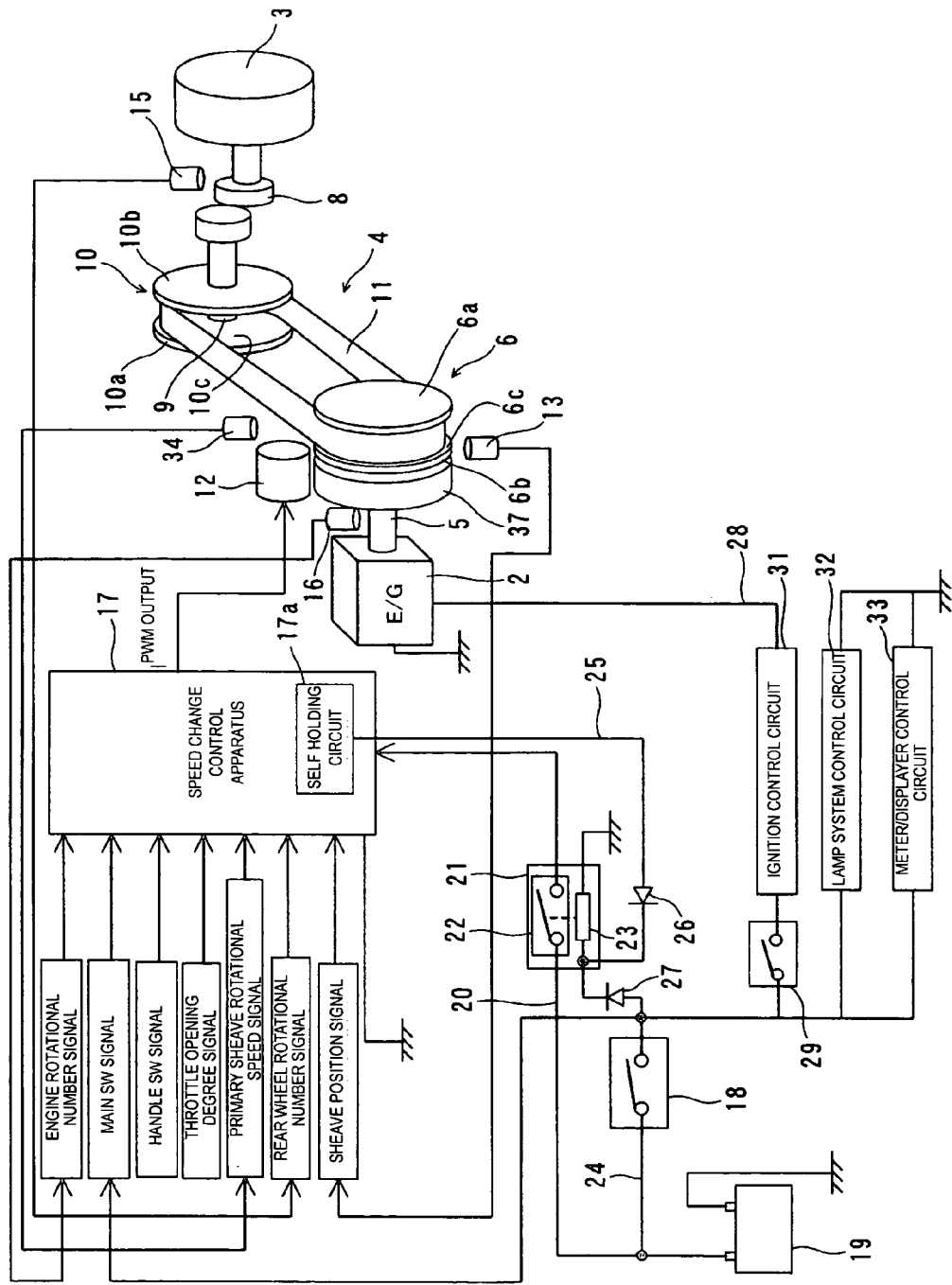
FIG. 13 is a diagram for explaining a speed change control of a continuously variable transmission of a motorcycle according to a fourth preferred embodiment of the invention.

FIG. 13 is a view for explaining a speed change control of a continuously variable transmission of a motorcycle according to a fourth preferred embodiment of the present invention. According to the fourth preferred embodiment, different from the first preferred embodiment, a centrifugal clutch 37 is arranged between the engine 2 and the primary sheave 6. Further, according to the fourth preferred embodiment, the speed change control apparatus 17 is constructed to control the gear ratio based on the rotational speed of the primary sheave 6 detected from the primary sheave rotational speed signal. Further, other features and elements of the fourth preferred embodiment are preferably similar to those of the first preferred embodiment.

According to the fourth preferred embodiment, as shown in FIG. 13, the centrifugal clutch 37 is arranged between the engine 2 and the primary sheave 6. Further, the centrifugal clutch 37 is arranged to transmit the drive force to the primary sheave 6 when the rotational speed of the engine 2 becomes equal to or greater than a predetermined value. Further, according to the fourth preferred embodiment, a centrifugal clutch is not arranged between the secondary sheave 10 and the speed reducing mechanism 8. Therefore, the secondary sheave 10 is directly connected to the speed reducing mechanism 8. Further, the continuously variable transmission 4 is provided with a primary sheave rotational speed sensor 34 for detecting rotation of the primary sheave 6. Further, the speed change control apparatus 17 is inputted with a primary sheave rotational speed signal outputted from the primary sheave rotational speed sensor 34. By comparing the rotational speed of the primary sheave 6 detected by the primary sheave rotational speed sensor 34 and the rotational speed of the engine 2 detected by the engine rotational speed sensor 16, it can be confirmed whether the primary shaft 5 and the centrifugal clutch 37 are connected.

Further, according to the fourth preferred embodiment, the secondary sheave rotational speed sensor for detecting rotation of the secondary sheave 10 is not provided.

Further, according to the fourth preferred embodiment, the speed change control apparatus 17 is arranged to detect the rotational speed of the primary sheave 6 based on the primary sheave rotational speed signal from the primary sheave rotational speed sensor 34.

Figure 14:
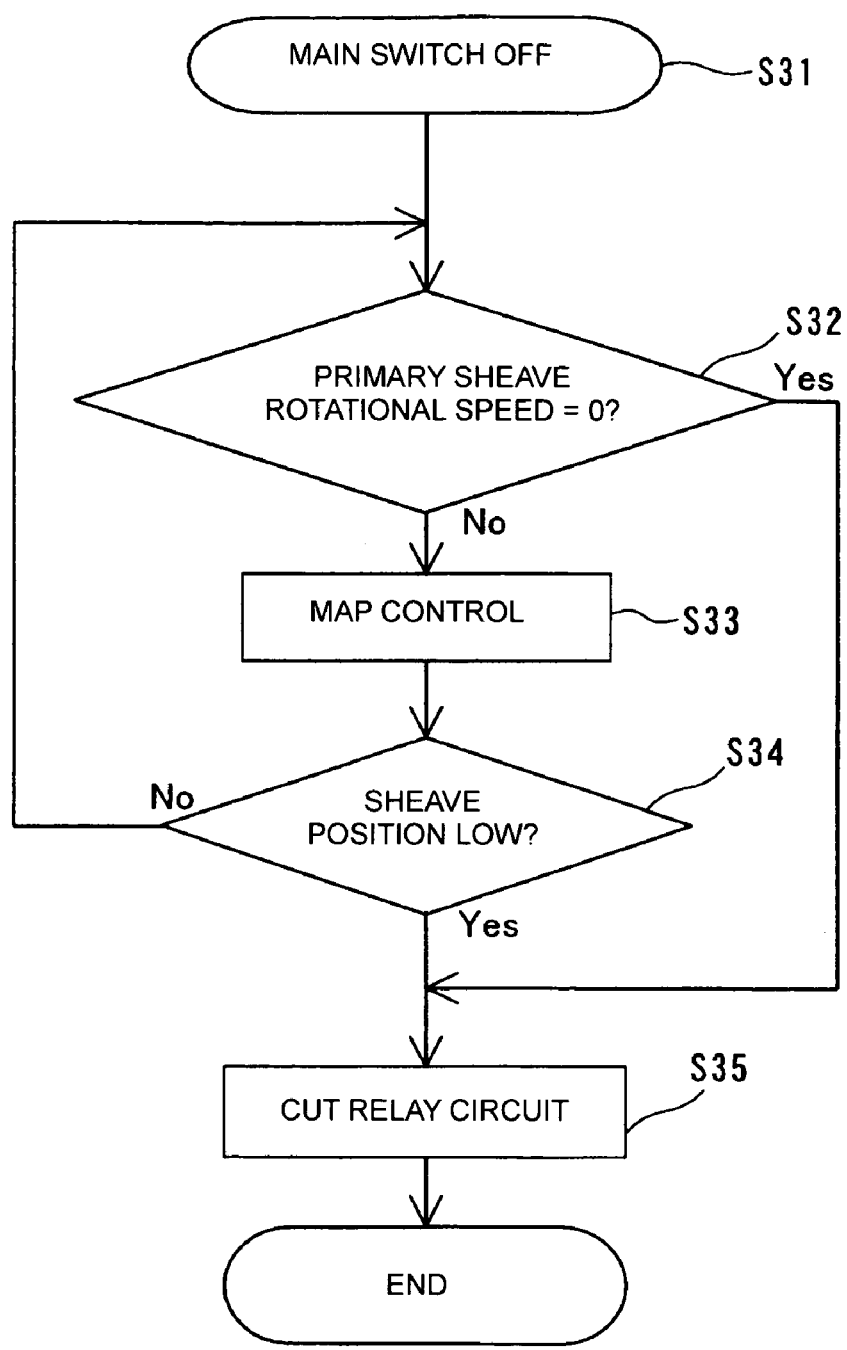
FIG. 14 is a diagram showing a processing flow of a speed change control apparatus when the main switch is turned OFF according to a fourth preferred embodiment of the present invention.

FIG. 14 is diagram showing a processing flow of the speed change control apparatus when the main switch is turned OFF according to the fourth preferred embodiment of the invention. Next, operation of the speed change control apparatus 17 according to the fourth preferred embodiment of the present invention will be explained in reference to FIG. 13 and FIG. 14.

At step S31 shown in FIG. 14, when the main switch 18 (refer to FIG. 13) is turned OFF, the main switch signal is not supplied to the speed change control apparatus 17. Further, at step S32, it is determined whether the rotational speed of the primary sheave 6 is 0 rpm. Further, according to the fourth preferred embodiment, the rotational speed of the primary sheave 6 is detected based on the primary sheave rotational speed signal from the primary sheave rotational speed sensor 34. At step S32, when it is determined that the rotational speed of the primary sheave 6 is 0 rpm, the operation proceeds to step S35. At step S35, the relay switch 22 is brought from the closed state (ON state) to the open state (OFF state) by stopping the application of voltage from the self holding circuit 17a to the switch control element 23 via the switch line 25. As a result, the relay circuit 21 is cut and the processing is finished. Thereby, supply of power from the vehicle-mounted power source 19 to the speed change control apparatus 17 is cut and the speed change control of the speed change control apparatus 17 is stopped. Further, at step S32, when it is determined that the rotational speed of the primary sheave 6 is not 0 rpm, at step S33, the gear ratio is changed to low by a map control similar to that of the above-described first preferred embodiment.

Thereafter, at step S34, it is determined whether the sheave position becomes low. When it is determined that the sheave position does not become low at step S34, the operation returns to step S32 and when it is determined that the sheave position becomes low at step S34, the operation proceeds to step S35. At step S35, the relay circuit 21 is cut and the processing is finished.

According to the fourth preferred embodiment, as described above, when rotation of the primary sheave 6 directly detected by the primary sheave rotational speed sensor 34 is stopped, the gear ratio of the continuously variable transmission 4 is not controlled. As a result, after stopping rotation of the primary sheave 6, the gear ratio of the continuously variable transmission 4 is not changed and therefore, the gear ratio of the continuously variable transmission 4 being changed after stopping to rotate the primary sheave 6 can be prevented. Consequently, the gear ratio of the continuously variable transmission 4 can be prevented from being changed after stopping to rotate the primary sheave 6 and the secondary sheave 10 and therefore, the tension of the V belt 11 can be effectively maintained. As a result, damage to the V belt 11 is reliably prevented when the engine is restarted in the state of loosening the V belt 11. Further, by arranging the centrifugal clutch 37 between the engine 2 and the primary sheave 6 as in the fourth preferred embodiment, when the rotational speed of the centrifugal clutch 37 becomes equal to or less than the predetermined rotational speed, the centrifugal clutch 37 is not provided with the function of transmitting the drive force of the engine 2 to the primary sheave 6 and therefore, when the rotational speed of the centrifugal clutch 37 becomes equal to or less than the predetermined rotational speed, the rotational speed of the primary sheave 6 cannot be detected by detecting rotation of the engine 2. In this case, it is effective to detect the rotational speed of the continuously variable transmission 4 by directly detecting rotation of the primary sheave 6 as described above.

Further, according to the fourth preferred embodiment, similar to the above-described third preferred embodiment, the V belt 11 of the belt type continuously variable transmission 4 is preferably made of an elastomer of rubber, resin or other suitable material and therefore, the V belt is liable to be damaged in comparison with the belt member made of a metal. In this case, as in the fourth preferred embodiment by controlling the gear ratio of the continuously variable transmission 4 by directly detecting the rotational speed of the primary sheave 6 via the primary sheave rotational speed sensor 34, it is particularly effective to prevent the V belt 11 from being loosened by preventing the gear ratio of the continuously variable transmission 4 from being controlled when the rotational speed of the primary sheave 6 becomes 0 rpm.

Further, other elements and features of the fourth preferred embodiment are similar to those of the above-described first preferred embodiment. That is, also according to the fourth preferred embodiment, similar to the first preferred embodiment, there is provided the speed change control apparatus 17 for continuously controlling the gear ratio of the continuously variable transmission 4 after instructing the engine 2 to stop by turning the main switch 18 OFF. Thereby, when the driver turns the main switch 18 OFF during running of the motorcycle, the gear ratio can be set effectively.

Fifth Preferred Embodiment

Figure 15:
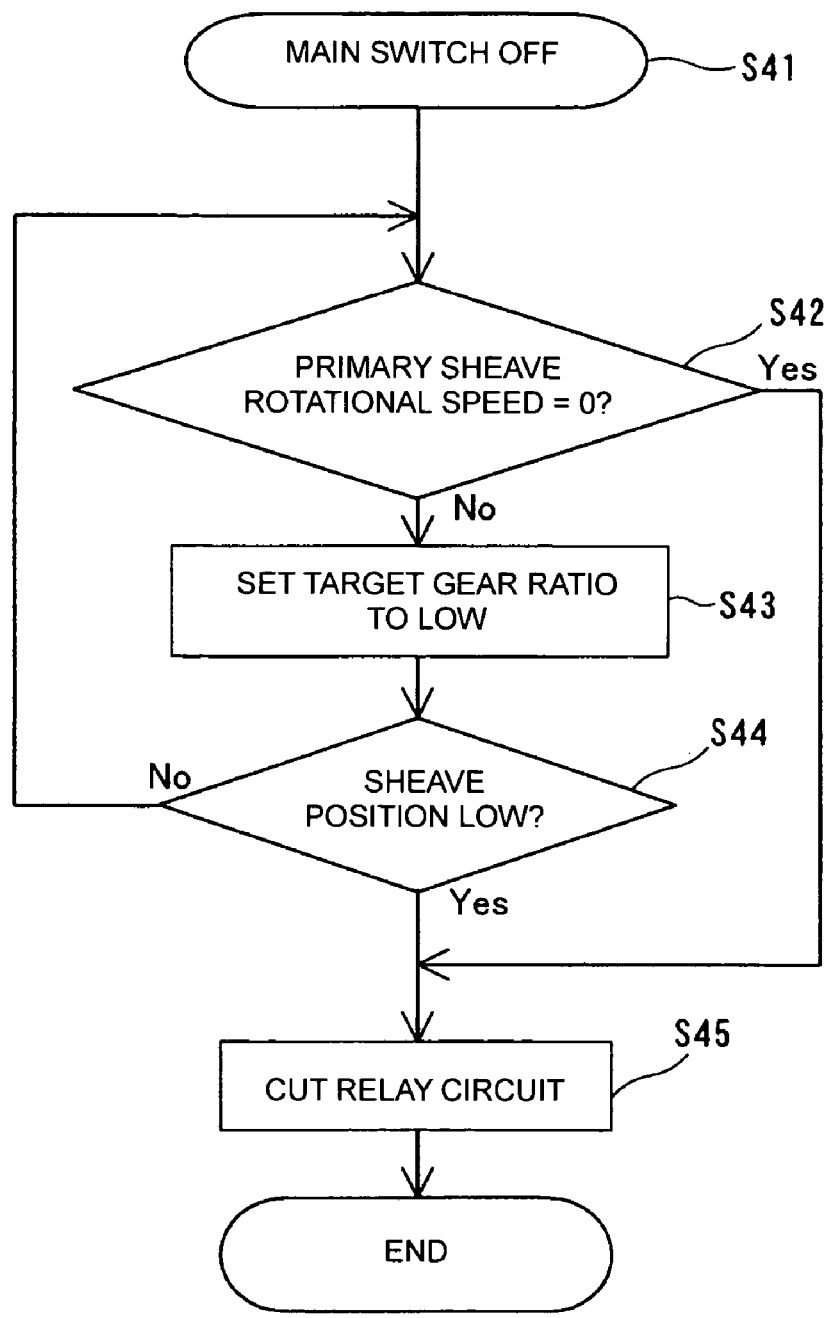
FIG. 15 is a diagram showing a processing flow of a speed change control apparatus when the main switch is turned OFF according to a fifth preferred embodiment of the present invention.

FIG. 15 is a diagram showing a processing flow of a speed change control apparatus when the main switch is turned OFF according to a fifth preferred embodiment of the present invention. According to the fifth preferred embodiment, an explanation will be given of an example structure that is arranged such that when the main switch 18 is turned OFF, the target gear ratio is set to low without executing a map control in the constitutions of the third and the fourth preferred embodiments. Further, other elements and features of the fifth preferred embodiment are preferably similar to those of the third preferred embodiment and the fourth preferred embodiment. An explanation will be given of the operation of the speed change control apparatus 17 according to the fifth preferred embodiment of the present invention with reference to FIG. 2, FIG. 13 and FIG. 15.

At step S41 shown in FIG. 15, when the main switch 18 is turned OFF, the main switch signal (refer to FIG. 2 and FIG. 13) is not supplied to the speed change control apparatus 17. Further, at step S42, it is determined whether the rotational speed of the primary sheave 6 is 0 rpm. At step S42, when it is determined that the rotational speed of the primary sheave 6 is 0 rpm (stationary state), at step S45, the relay circuit 21 is cut and the processing is finished by bringing the relay switch 22 from the closed state (ON state) to the open state (OFF state) by stopping to apply a voltage from the self holding circuit 17a to the switch control element 23 via the switch line 25. As a result, supply of power from the vehicle-mounted power source 19 to the speed change control apparatus 17 is cut and the speed change control of the speed change control apparatus 17 is stopped. Further, at step S42, when it is determined that the rotational speed of the primary sheave 6 is not 0 rpm (running state), at step S43, the target gear ratio (sheave target value) is fixedly set to low. Thereby, the movable sheave 6b of the primary sheave 6 is immediately moved to the position of the low state by using the sheave position moving apparatus 12.

Thereafter, at step S44, it is determined whether the sheave position becomes low. When it is determined that the sheave position does not become low at step S44, the operation returns to step S42, and when it is determined that the sheave position becomes low at step S44, the operation proceeds to step S45. At step S45, the relay circuit 21 is cut and the processing is finished.

According to the fifth preferred embodiment, as described above, after the engine 2 is instructed to stop by turning the main switch 18 OFF, when the rotational speed of the primary sheave 6 is greater than 0 rpm, by setting the target gear ratio (sheave target value) of the continuously variable transmission 4 to low, in comparison with the case of using the map control, the gear ratio of the continuously variable transmission 4 can be quickly changed to become close to low.

Further, other features and advantages of the fifth preferred embodiment are similar to those of the third preferred embodiment and the fourth preferred embodiment.

Sixth Preferred Embodiment

Figure 16:
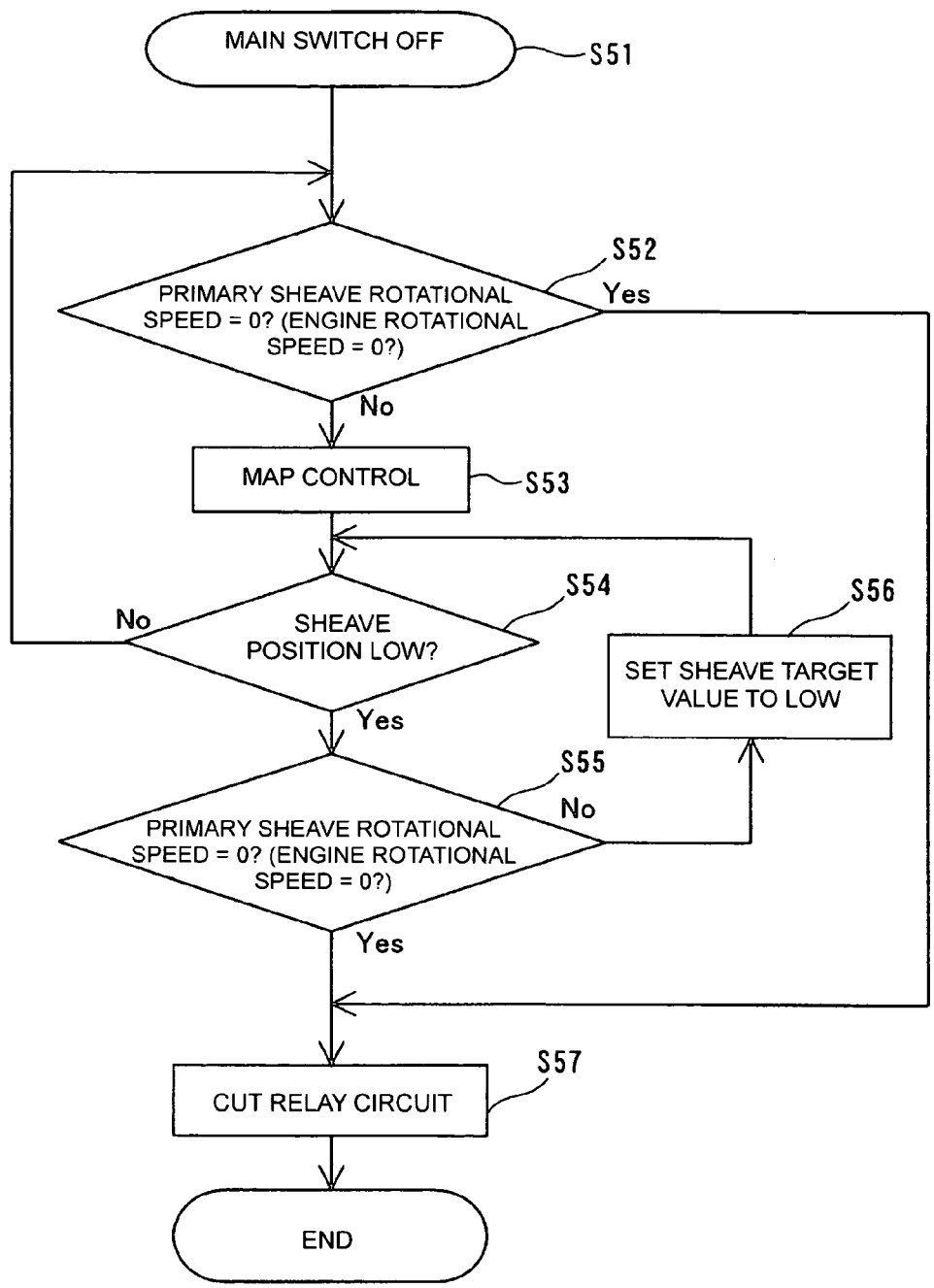
FIG. 16 is a diagram showing a processing flow of a speed change control apparatus when the main switch is turned OFF according to a sixth preferred embodiment of the present invention.

FIG. 16 is a diagram showing a processing flow of a speed change control apparatus when the main switch is turned OFF according to a sixth preferred embodiment of the present invention. According to the sixth preferred embodiment, different from the third preferred embodiment, an explanation will be given of a case in which when the sheave position becomes low by the map control, the sheave target value is set to low until the rotational speed of the primary sheave 6 becomes 0 rpm. Further, other elements and features of the sixth preferred embodiment are similar to those of the third preferred embodiment.

An explanation will be given of operation of the speed change control apparatus 17 according to the sixth preferred embodiment of the present invention in reference to FIG. 2 and FIG. 16 as follows.

At step S51 shown in FIG. 16, when the main switch 18 (refer to FIG. 2) is turned OFF, the main switch signal is not supplied to the speed change control apparatus 17. Further, at step S52, it is determined whether the rotational speed of the primary sheave 6 is 0 rpm. At step S52, when it is determined that the rotational speed of the primary sheave 6 is 0 rpm, at step S57, the relay circuit 21 is cut and the processing is finished by bringing the relay switch 22 from the closed state (ON state) to the open state (OFF state) by stopping the application of voltage from the self holding circuit 17*a* to the switch control element 23 via the switch line 25. As a result, the supply of power from the vehicle-mounted power source 19 to the speed change control apparatus 17 is cut and the speed change control of the speed change control apparatus 17 is stopped. Further, at step S52, when it is determined that the rotational speed of the primary sheave 6 is not 0 rpm, at step S53, the gear ratio is changed to low by a map control similar to that of the above-described first preferred embodiment.

Thereafter, at step S54, it is determined whether the sheave position becomes low. When it is determined that the sheave position does not become low at step S54, the operation returns to step S52, and when it is determined that the sheave position becomes low at step S54, the operation proceeds to step S55. At step S55, it is determined whether the rotational speed of the primary sheave 6 becomes 0 rpm, and when it is determined that the rotational speed of the primary sheave 6 does not become 0 rpm, at step S56, the sheave target value is set to low and the speed change control continues. Further, determinations at step S54 and step S55 are repeated. In this case, according to the speed change control apparatus 17, the gear ratio is held to low until the rotational speed of the primary sheave 6 becomes 0 rpm. Thereafter, when the rotational speed of the primary sheave 6 becomes 0 rpm, at step S55, it is determined that the rotational speed of the primary sheave 6 is 0 rpm, at step S57, the relay circuit 21 is cut and the processing is finished.

When the gear ratio control continues after turning the main switch 18 OFF, in the case in which a road is oriented downhill, there is a case of varying the gear ratio from an upper range to an upper range due to the fact that the vehicle speed is increased. According to the sixth preferred embodiment, as described above, after the engine 2 is instructed to stop by turning the main switch 18 OFF, when the gear ratio becomes low, the gear ratio of low is maintained until the rotational speed of the primary sheave 6 becomes 0 rpm. In this way, according to the sixth preferred embodiment, the gear ratio is maintained to be low and therefore, the engine brake can be easily operated in comparison with the case of varying the gear ratio to the upper range. As a result, the vehicle speed can further be prevented from being increased and therefore, the operability of the motorcycle is greatly improved.

Further, other features and advantages of the sixth preferred embodiment is similar to that of the above-described third preferred embodiment.

Seventh Preferred Embodiment

Figure 17:
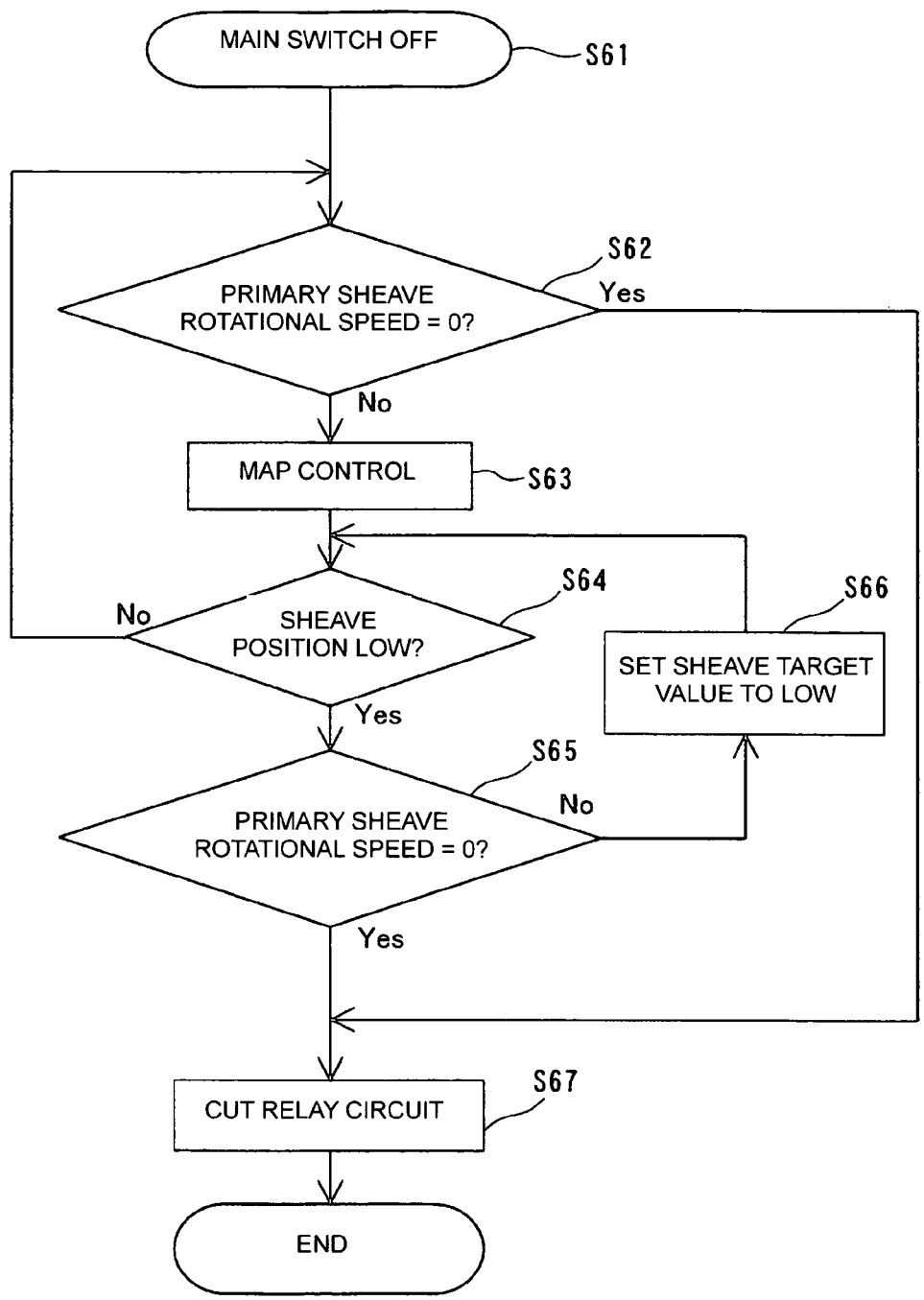
FIG. 17 is a diagram showing a processing flow of a speed change control apparatus when the main switch is turned OFF according to a seventh preferred embodiment of the present invention.

FIG. 17 is a diagram showing a processing flow of a speed change control apparatus when the main switch is turned OFF according to a seventh preferred embodiment of the present invention. According to the seventh preferred embodiment, different from the above-described fourth preferred embodiment (refer to FIG. 14), an explanation will be given of a case in which when the sheave position becomes low by a map control, the sheave target value is set to low until the rotational speed of the primary sheave 6 becomes 0 rpm. Further, other elements and features of the seventh preferred embodiment are similar to those of the fourth preferred embodiment.

An explanation will be given of an operation of the speed change control apparatus 17 according to the seventh preferred embodiment of the present invention with reference to FIG. 13 and FIG. 17.

At step S61 shown in FIG. 17, when the main switch 18 (refer to FIG. 13) is turned OFF, the main switch signal is not supplied to the speed change control apparatus 17. Further, at step S62, it is determined whether the rotational speed of the primary sheave 6 is 0 rpm. At step S62, when it is determined that the rotational speed of the primary sheave 6 is 0 rpm, at step S67, the relay circuit 21 is cut and the processing is finished by bringing the relay switch 22 from the closed state (ON state) to the open state (OFF state) by stopping the application of voltage from the self holding circuit 17*a* to the switch control element 23 via the switch line 25. Thereby, the supply of power from the vehicle-mounted power source 19 to the speed change control apparatus 17 is cut and the speed change control of the speed change control apparatus 17 is stopped. Further, at step S62, when it is determined that the rotational speed of the primary sheave 6 is not 0 rpm, at step S63, the gear ratio is changed to low by a map control similar to that of the above-described first preferred embodiment.

Thereafter, at step S64, it is determined whether the sheave position becomes low. When it is determined that the sheave position does not become low at step S64, the operation returns to step S62, and when it is determined that the sheave position becomes low at step S64, the operation proceeds to step S65. At step S65, it is determined whether the rotational speed of the primary sheave 6 becomes 0 rpm, and when it is determined that the rotational speed of the primary sheave 6 does not become 0 rpm, at step S66, the sheave target value is set to low and the speed change control continues. Further, determinations at step S64 and step S65 are repeated. In this case, according to the speed change control apparatus 17, the gear ratio is maintained to be low until the rotational speed of the primary sheave 6 becomes 0 rpm. Thereafter, when the rotational speed of the primary sheave 6 becomes 0 rpm, at step S65, it is determined that the rotational speed of the primary sheave 6 is 0 rpm, at step S67, the relay circuit 21 is cut and the processing is finished.

When the gear ratio control continues after turning the main switch 18 OFF, in the case in which a road is oriented downhill, there is a case in which the gear ratio is varied from lower range to an upper range due to the fact that the vehicle speed is increased. According to the seventh preferred embodiment, as described above, after the engine 2 is instructed to stop by turning the main switch 18 OFF, when the gear ratio becomes low, the gear ratio is maintained to be low until the rotational speed of the primary sheave 6 becomes 0 rpm. In this way, according to the seventh preferred embodiment, the gear ratio is maintained to be low and therefore, the engine brake can further be easily operated in comparison with the case of varying the gear ratio at the upper range. As a result, the vehicle speed can further be prevented from being increased and therefore, the operability of the motorcycle is greatly improved.

Further, other features and advantages of the seventh preferred embodiment are similar to those of the above-described fourth preferred embodiment.

Eight Preferred Embodiment

Figure 18:
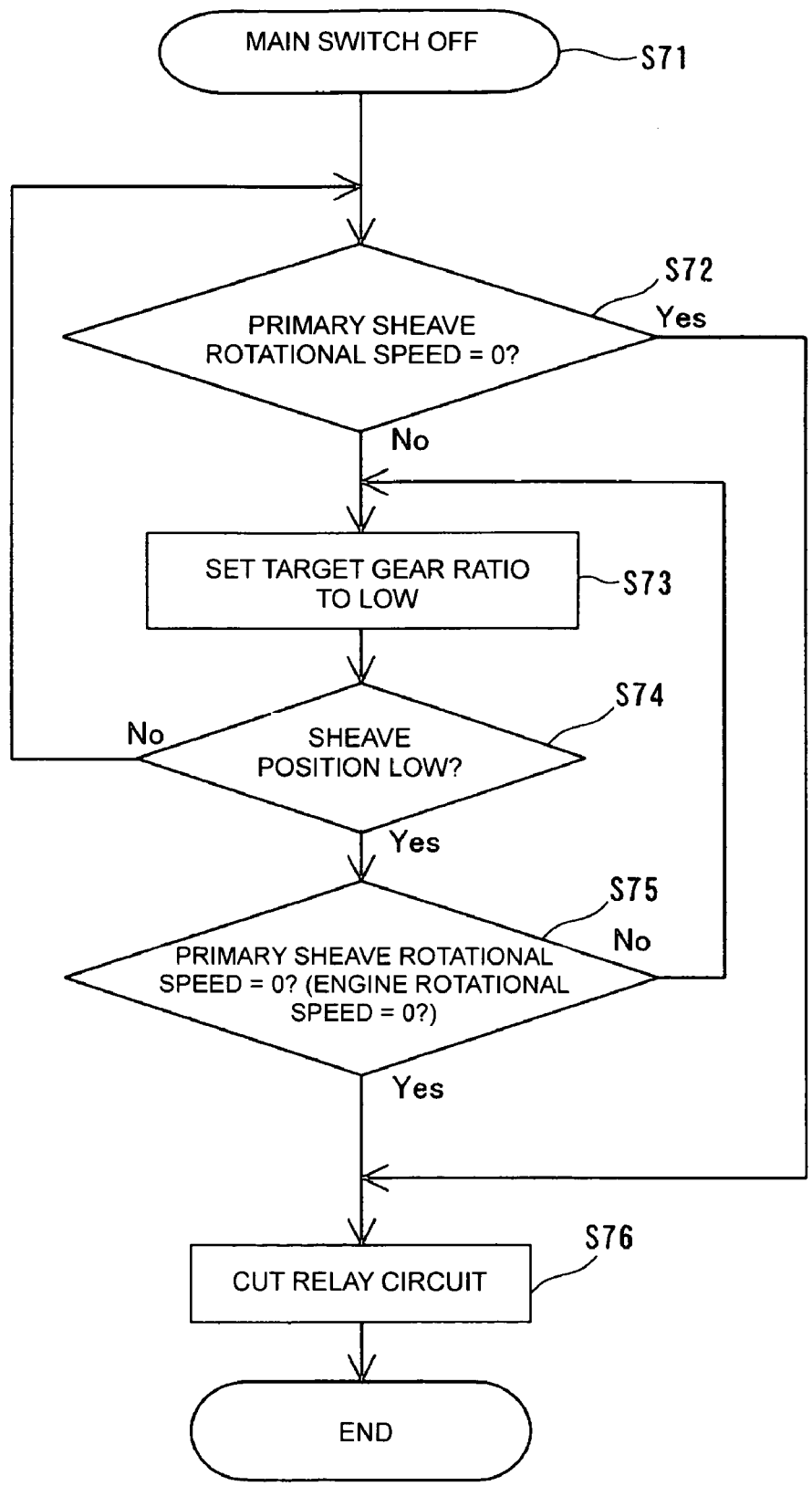
FIG. 18 is a diagram showing a processing flow of a speed change control apparatus when the main switch is turned OFF according to an eighth preferred embodiment of the present invention.

FIG. 18 is a diagram showing a processing flow of a speed change control apparatus when the main switch is turned OFF according to an eighth preferred embodiment of the present invention. According to the eighth preferred embodiment, different from the above-described sixth and seventh preferred embodiments, an explanation will be given of an example of a construction that is arranged such that when the main switch 18 is turned OFF, the target gear ratio is set to low without executing a map control. Further, other features and elements of the eighth preferred embodiment are preferably similar to those of the above-described sixth and seventh preferred embodiments. An explanation will be given of operation of the speed change control apparatus 17 according to the eighth preferred embodiment of the present invention with reference to FIG. 2, FIG. 13 and FIG. 18.

At step S71 shown in FIG. 18, when the main switch 18 is turned OFF, the main switch signal (refer to FIG. 2 and FIG. 13) is not supplied to the speed change control apparatus 17. Further, at step S72, it is determined whether the rotational speed of the primary sheave 6 is 0 rpm. At step S72, when it is determined that the rotational speed of the primary sheave 6 is 0 rpm (stationary state), at step S76, the relay circuit 21 is cut and the processing is finished by bringing the relay switch 22 from the closed state (ON state) to the open state (OFF state) by stopping the application of voltage from the self holding circuit 17a to the switch control element 23 via the switch line 25. Thereby, supply of power from the vehicle-mounted power source 19 to the speed change control apparatus 17 is cut and the speed change control of the speed change control apparatus 17 is stopped. Further, at step S72, when it is determined that the rotational speed of the primary sheave 6 is not 0 rpm (running state), at step S73, the target gear ratio (sheave target value) is fixedly set to low. Thereby, the movable sheave 6b of the primary sheave 6 is immediately moved to a low position by using the sheave position moving apparatus 12.

Thereafter, at step S74, it is determined whether the sheave position becomes low. When it is determined that the sheave position does not become low at step S74, the operation returns to step S72, and when it is determined that the sheave position becomes low at step S74, the operation proceeds to step S75. At step S75, it is determined whether the rotational speed of the primary sheave 6 becomes 0 rpm, and when it is determined that the rotational speed of the primary sheave 6 does not become 0 rpm, the operation returns to step S73 and determinations at step S74 and step S75 are repeated. In this case, according to the speed change control apparatus 17, the gear ratio is maintained to be low until the rotational speed of the primary sheave 6 becomes 0 rpm. Thereafter, when the rotational speed of the primary sheave 6 becomes 0 rpm, it is determined that the rotational speed of the primary sheave 6 is 0 rpm at step 75, at step S76, the relay circuit 21 is cut and the processing is finished.

According to the eighth preferred embodiment, as described above, after the engine 2 is instructed to stop by turning the main switch 18 OFF, when the rotational speed of the primary sheave 6 is greater than 0 rpm, the target gear ratio (sheave target value) of the continuously variable transmission 4 is set to be low. Thereby, in comparison with the case of using the map control, the gear ratio of the continuously variable transmission 4 can quickly be changed to be close to low.

Further, other features and advantages of the eighth preferred embodiment are similar to those of the above-described sixth preferred embodiment and the seventh preferred embodiment.

Further, the preferred embodiments disclosed herein are merely examples and are not restrictive in all aspects thereof. The range of the present invention is shown not by the above-described explanation of various preferred embodiments but by the scope of claims and includes all variations, modifications, combinations and equivalents within the scope of the following claims.

For example, although according to the above-described preferred embodiments, the scooter type motorcycle is shown as an example of the vehicle of the present invention, the present invention is not limited thereto but is applicable also to a vehicle other than the scooter type motorcycle as long as the vehicle is a vehicle having a continuously variable transmission.

Further, although according to the above-described preferred embodiments, an explanation has been given of the case of setting the vehicle speed and the predetermined value of the rotational speed of the primary sheave in interrupting the speed change control by the speed change control apparatus to 0, the present invention is not limited thereto but the vehicle speed and the predetermined value of the rotational speed of the primary sheave in interrupting the speed change control by the speed change control apparatus may be set to a value other than 0.

Further, although according to the third preferred embodiment through the eighth preferred embodiment, the rotational speed of the primary sheave is detected by the engine rotational speed sensor or the primary sheave rotational speed sensor and when the primary sheave rotational speed becomes 0 rpm, the speed change control is stopped, the present invention is not limited thereto but the secondary sheave rotational speed may be detected by the secondary sheave rotational speed sensor or the rear wheel rotational speed sensor and the speed change control may be stopped when the secondary sheave rotational speed becomes 0 rpm.

Further, although according to the above-described preferred embodiments, an example of providing the belt type continuously variable transmission is provided to a motorcycle, the present invention is not limited thereto but a motorcycle may be provided with a continuously variable transmission of a toroidal type, or may be provided with a continuously variable transmission of other than the toroidal type.

Further, although according to the above-described preferred embodiments, an example of using the engine constituted by the internal combustion engine for the drive force generating device is shown, the present invention is not limited thereto but an electric motor may be used for the drive force generating device.

Further, although according to the third preferred embodiment through the fifth preferred embodiment, an example of cutting the relay circuit and the finishing the processing when it is determined that the sheave position becomes low is shown, the present invention is not limited thereto but when it is determined that the sheave position becomes low, after the primary sheave rotational speed or the engine rotational speed becomes 0 rpm, the relay circuit may be cut and the processing may be finished.

What is claimed is:

1. A vehicle comprising:
   a drive force generating device;
   a first switch arranged to control the drive force generating device and being operable by a driver;
   a continuously variable transmission arranged to transmit a drive force generated by the drive force generating device to a drive wheel;
   a speed change controller arranged to control a gear ratio of the continuously variable transmission and continuously control the gear ratio of the continuously variable transmission after the drive force generating device is instructed to stop due to turning off of the first switch; and
   a power supply arranged to continue supplying power to the speed change controller when the first switch is turned off.

2. The vehicle according to claim 1, further comprising:
   a second switch connected between the power supply and the speed change controller and turned on in response to turning on of the first switch;
   wherein when the vehicle speed is greater than the predetermined value after the drive force generating device is instructed to stop due to turning off of the first switch, the speed change controller maintains an ON state of the second switch and brings the second switch into an OFF state when the vehicle speed becomes equal to or less than the predetermined value.

3. The vehicle according to claim 1, wherein the speed change controller continuously controls the gear ratio by setting a target gear ratio of the continuously variable transmission to a predetermined value in a lower range when the gear ratio becomes the predetermined value in the lower range.

4. The vehicle according to claim 1, wherein the power supply continues to supply power to the speed change controller to continue a speed change control when a vehicle speed is greater than a predetermined value after the drive force generating device is instructed to stop due to turning off of the first switch.

5. The vehicle according to claim 4, wherein the predetermined value of the vehicle speed is 0.

6. The vehicle according to claim 1, wherein the speed change controller controls the continuously variable transmission when a vehicle speed is greater than a predetermined value after the drive force generating device is instructed to stop due to turning off of the first switch.

7. The vehicle according to claim 6, wherein the speed change controller controls the continuously variable transmission based on a map for a speed change control when the vehicle speed is greater than the predetermined value after the drive force generating device is instructed to stop due to turning off of the first switch.

8. The vehicle according to claim 6, wherein the speed change controller sets a target gear ratio of the continuously variable transmission to a value in a lower range when the vehicle speed is greater than the predetermined value after the drive force generating device is instructed to stop due to turning off of the first switch.

9. The vehicle according to claim 6, wherein when the gear ratio becomes a predetermined gear ratio in a lower range after the drive force generating device is instructed to stop due to turning off of the first switch, the speed change controller maintains the predetermined gear ratio in the lower range until the vehicle speed becomes equal to or less than the predetermined value.

10. The vehicle according to claim 1, wherein the continuously variable transmission includes a first drive force transmitter arranged to receive a drive force from the drive force generating device and a second drive force transmitter arranged to transmit the drive force from the first drive force transmitter to the drive wheel; and
    the speed change controller continuously controls the gear ratio of the continuously variable transmission by detecting rotation of at least one of the first drive force transmitter and the second drive force transmitter.

11. The vehicle according to claim 10, wherein the speed change controller controls the gear ratio of the continuously variable transmission by electrically controlling one of the first drive force transmitter and the second drive force transmitter.

12. The vehicle according to claim 10, further comprising a clutch arranged at one of a first position between the second drive force transmitter and the drive wheel and a second position between the drive force generating device and the first drive force transmitter.

13. The vehicle according to claim 12, further comprising the clutch arranged between the second drive force transmitter and the drive wheel, wherein the speed change controller continuously controls the continuously variable transmission by detecting rotation of the drive force generating device and stops controlling the continuously variable transmission when a rotational speed of the drive force generating device becomes equal to or less than a predetermined value.

14. The vehicle according to claim 12, further comprising the clutch arranged between the drive force generating device and the first drive force transmitter, wherein the speed change controller continuously controls the continuously variable transmission by detecting rotation of the first drive force transmitter.

15. The vehicle according to claim 14, wherein the speed change controller stops controlling the continuously variable transmission when a rotational speed of the first drive force transmitter becomes equal to or less than a predetermined value.

16. The vehicle according to claim 10, wherein the speed change controller stops controlling the continuously variable transmission when a rotational speed of at least one of the first drive force transmitter and the second drive force transmitter becomes equal to or smaller than a predetermined value.

17. The vehicle according to claim 16, wherein the predetermined value is 0.

18. The vehicle according to claim 10, wherein the continuously variable transmission is an electrically controlled belt type continuously variable transmission.

19. The vehicle according to claim 18, wherein a belt member of the electrically controlled belt type continuously variable transmission is made of an elastomer.

* * * * *